(12) United States Patent
Norisada et al.

(10) Patent No.: US 12,040,618 B2
(45) Date of Patent: Jul. 16, 2024

(54) POWER CONVERSION SYSTEM INCLUDING A SECOND CIRCUIT BEING CONFIGURED TO CONTROL A CURRENT OR POWER SUCH THAT THE CURRENT OR THE POWER IS SYNCHRONIZED WITH POWER RIPPLES CAUSED BY THE AC POWER SUPPLY OR THE AC LOAD

(71) Applicant: Panasonic Intellectual Property Management Co., Ltd., Osaka (JP)

(72) Inventors: Takaaki Norisada, Kanagawa (JP); Fumito Kusama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 372 days.

(21) Appl. No.: 17/440,598

(22) PCT Filed: Mar. 5, 2020

(86) PCT No.: PCT/JP2020/009527
§ 371 (c)(1),
(2) Date: Sep. 17, 2021

(87) PCT Pub. No.: WO2020/189318
PCT Pub. Date: Sep. 24, 2020

(65) Prior Publication Data
US 2022/0200480 A1    Jun. 23, 2022

(30) Foreign Application Priority Data
Mar. 18, 2019   (JP) .................. 2019-050369

(51) Int. Cl.
*H02J 3/38*    (2006.01)
*H02M 1/00*    (2006.01)
*H02M 1/14*    (2006.01)

(52) U.S. Cl.
CPC ............... *H02J 3/38* (2013.01); *H02M 1/007* (2021.05); *H02M 1/143* (2013.01)

(58) Field of Classification Search
CPC . H02J 3/38; H02M 1/007–0077; H02M 1/143
See application file for complete search history.

(56) References Cited

U.S. PATENT DOCUMENTS

2010/0071742 A1* 3/2010 de Rooij ................. H02J 3/46
                                                              136/244
2018/0287511 A1  10/2018 Ayai
(Continued)

FOREIGN PATENT DOCUMENTS

JP  2003-333848 A  11/2003
JP  2015-198487 A  11/2015
(Continued)

OTHER PUBLICATIONS

International Search Report and Written Opinion issued in International Patent Application No. PCT/JP2020/009527, mailed on Jun. 23, 2020; with partial English translation.

Primary Examiner — Peter M Novak
(74) Attorney, Agent, or Firm — Rimon P.C.

(57) ABSTRACT

A power conversion system according to the present disclosure includes a first circuit, a second circuit, and a third circuit. The first circuit has a first external terminal thereof electrically connected to either an AC power supply or an AC load. In the power conversion system, a first internal terminal, a second internal terminal, and a third internal terminal are electrically connected to the same connection unit. The second circuit controls a current or power being input to, or output from, the second circuit itself such that the current or the power is synchronized with power ripples (Continued)

caused by the AC power supply or the AC load. Either the AC power supply or the AC load is electrically connected to the first circuit.

10 Claims, 10 Drawing Sheets

(56) References Cited

U.S. PATENT DOCUMENTS

2019/0341776 A1\* 11/2019 Au .................. H02J 7/0013
2020/0153350 A1\* 5/2020 Yoshimitsu ....... H02M 3/33592

FOREIGN PATENT DOCUMENTS

| JP | 2016-201893 A | 12/2016 |
| WO | 2015/151399 A1 | 10/2015 |
| WO | 2017/068814 A1 | 4/2017 |

\* cited by examiner

POWER CONVERSION SYSTEM INCLUDING A SECOND CIRCUIT BEING CONFIGURED TO CONTROL A CURRENT OR POWER SUCH THAT THE CURRENT OR THE POWER IS SYNCHRONIZED WITH POWER RIPPLES CAUSED BY THE AC POWER SUPPLY OR THE AC LOAD

CROSS-REFERENCE OF RELATED APPLICATIONS

This application is the U.S. National Phase under 35 U.S.C. § 371 of International Patent Application No. PCT/JP2020/009527, filed on Mar. 5, 2020, which in turn claims the benefit of Japanese Application No. 2019-050369, filed on Mar. 18, 2019, the entire disclosures of which Applications are incorporated by reference herein.

TECHNICAL FIELD

The present disclosure generally relates to a power conversion system, a method for controlling the power conversion system, and a program, and more particularly relates to a power conversion system for converting power either unidirectionally or bidirectionally, a method for controlling such a power conversion system, and a program.

BACKGROUND ART

Patent Literature 1 discloses a power converter (power conversion system) which may be connected to a solar power generation panel. The power converter of Patent Literature 1 is configured to convert DC power into AC power and includes a DC/DC converter and a DC/AC converter. The DC/AC converter is connected to the DC/DC converter via an intermediate bus. An intermediate smoothing capacitor is connected to the intermediate bus.

The power converter of Patent Literature 1 requires the smoothing capacitor (intermediate capacitor) to reduce the effect of ripples caused by an AC grid connected to the DC/AC converter.

CITATION LIST

Patent Literature

Patent Literature 1: WO 2017/068814 A1

SUMMARY OF INVENTION

It is therefore an object of the present disclosure to provide a power conversion system, a method for controlling the power conversion system, and a program, all of which are configured or designed to reduce, without using any smoothing capacitor, the effect of power ripples caused by an AC power supply or an AC load.

A power conversion system according to an aspect of the present disclosure includes a first circuit and a second circuit and transmits DC power between a first internal terminal of the first circuit and a second internal terminal of the second circuit. The first circuit includes the first internal terminal and a first external terminal and has the first external terminal electrically connected to either an AC power supply or an AC load. The second circuit includes the second internal terminal and a second external terminal. The power conversion system further includes a third circuit. The third circuit includes at least a third internal terminal. In the power conversion system, the first internal terminal, the second internal terminal, and the third internal terminal are electrically connected to the same connection unit. The second circuit controls a current or power being input to, or output from, the second circuit itself such that the current or the power is synchronized with power ripples caused by the AC power supply or the AC load. Either the AC power supply or the AC load is electrically connected to the first circuit.

A method for controlling a power conversion system according to another aspect of the present disclosure is designed to control a power conversion system including a first circuit, a second circuit, and a third circuit. The power conversion system transmits DC power between a first internal terminal of the first circuit and a second internal terminal of the second circuit. In the power conversion system, the first internal terminal, the second internal terminal, and a third internal terminal are electrically connected to the same connection unit. The first circuit includes the first internal terminal and a first external terminal and has the first external terminal electrically connected to either an AC power supply or an AC load. The second circuit includes the second internal terminal and a second external terminal. The third circuit includes at least the third internal terminal. The method for controlling this power conversion system includes making the second circuit control a current or power being input to, or output from, the second circuit itself such that the current or the power is synchronized with power ripples caused by the AC power supply or the AC load. Either the AC power supply or the AC load is electrically connected to the first circuit.

A program according to still another aspect of the present disclosure is designed to cause a computer system to perform the method for controlling the power conversion system described above.

DESCRIPTION OF EMBODIMENTS

Embodiment (1) Overview

An overview of a power conversion system 10 according to an exemplary embodiment will be described with reference to FIG. 1.

Figure 1:
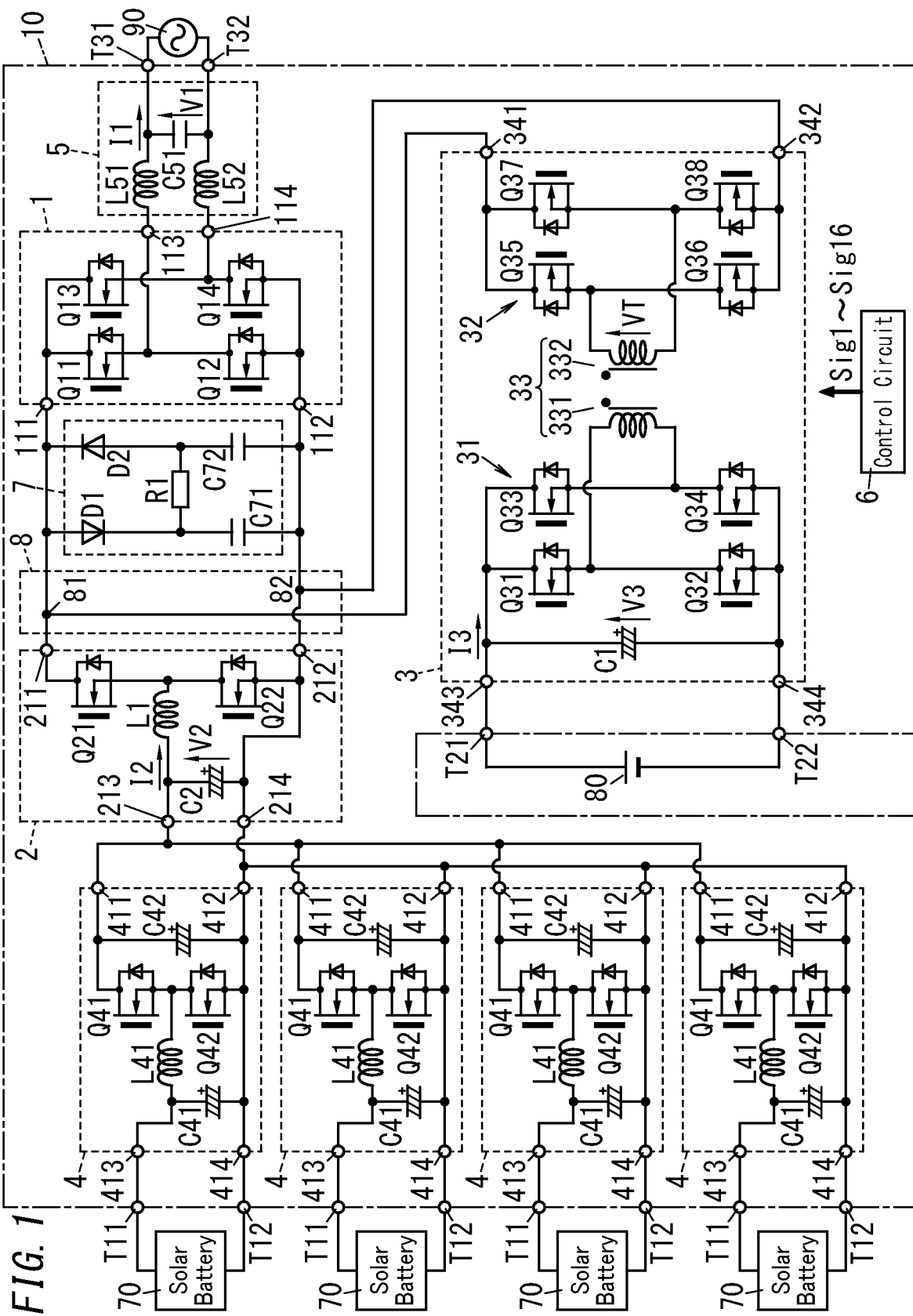
FIG. 1 is a circuit diagram illustrating a configuration for a power conversion system according to an exemplary embodiment.

A power conversion system 10 according to this embodiment is a system for performing power conversion between multiple pairs (e.g., four pairs in the example illustrated in FIG. 1) of first DC terminals T11, T12, a single pair of second DC terminals T21, T22, and a single pair of AC terminals T31, T32 as shown in FIG. 1. A solar battery 70 is electrically connected to each pair of first DC terminals T11, T12. A storage battery 80 is electrically connected to the second DC terminals T21, T22. A power grid 90 is electrically connected to the AC terminals T31, T32. As used herein, the "power grid" refers to an overall system that allows an electric power supplier such as an electric power company to supply electric power to a customer's power receiving equipment.

The power conversion system 10 according to this embodiment converts DC power supplied from at least one of the solar battery 70 or the storage battery 80 into AC power having a single phase and outputs (transmits) the AC power to the power grid 90. In addition, the power conversion system 10 also converts the AC power supplied from the power grid 90 into DC power and outputs the DC power to the storage battery 80.

In other words, while the solar battery 70 is generating power or while the storage battery 80 is discharging, the power conversion system 10 converts the DC power supplied from the solar battery 70 and the storage battery 80 into AC power and outputs the AC power to the power grid 90. In this case, each of the solar battery 70 and the storage battery 80 serves as a "DC power supply" and the power grid 90 serves as a "single-phase AC load (AC load)." On the other hand, while the storage battery 80 is charging, the power conversion system 10 converts the AC power supplied from the power grid 90 into DC power and outputs the DC power to the storage battery 80. In this case, the storage battery 80 serves as a "DC load" and the power grid 90 serves as a "single-phase AC power supply (AC power supply)."

The power conversion system 10 according to this embodiment includes a first circuit 1 and a second circuit 2 as shown in FIG. 1 and transmits DC power between first internal terminals 111, 112 of the first circuit 1 and second internal terminals 211, 212 of the second circuit 2. The first circuit 1 includes the first internal terminals 111, 112 and first external terminals 113, 114 and has the first external terminals 113, 114 electrically connected to the power grid 90 (serving as either an AC power supply or an AC load). The second circuit 2 includes the second internal terminals 211, 212 and second external terminals 213, 214.

The power conversion system 10 further includes a third circuit 3 as shown in FIG. 1. The third circuit 3 includes at least third internal terminals 341, 342. In the power conversion system 10, the first internal terminals 111, 112, the second internal terminals 211, 212, and the third internal terminals 341, 342 are electrically connected to the same connection unit 8. The second circuit 2 controls a current or power being input to, or output from, the second circuit 2 itself such that the current or the power is synchronized with power ripples caused by the power grid 90 electrically connected to the first circuit 1. As used herein, the "power ripples" refer to power obtained by subtracting active power from instantaneous power. That is to say, the "power ripples" means the differential power between the instantaneous power and the active power.

As described above, in the power conversion system 10 according to this embodiment, the second circuit 2 controls a current or power being input to, or output from, the second circuit 2 itself such that the current or the power is synchronized with power ripples caused by the power grid 90. This allows the second circuit 2 to take charge of at least a part of the power ripples caused by the power grid 90. Consequently, this may reduce the effect of the power ripples on the third circuit 3 even without using any smoothing capacitor.

In the following description of an exemplary embodiment, the power conversion system 10 will be described as being introduced into a non-dwelling facility such as an office building, a hospital, a commercial facility, or a school.

In recent years, in particular, there has been a growing trend for a corporation or an individual person to "sell electricity" by causing a reverse power flow of the power obtained from a distributed power supply (such as the solar battery 70, the storage battery 80, or a fuel cell) toward a commercial power grid. Selling electricity is realized by connecting the distributed power supply to the commercial power grid. When the grid connection is made, the power generated by the distributed power supply is converted into power adapted to the commercial power grid by using a power conversion system 10 called a "power conditioner." The power conversion system 10 according to this embodiment may be used, for example, as a power conditioner to convert DC power into single-phase AC power, or vice versa, between the solar battery 70 and the storage battery 80 as a distributed power supply and the power grid 90.

(2) Configuration

Next, a configuration for the power conversion system 10 according to this embodiment will be described with reference to FIG. 1.

The power conversion system 10 according to this embodiment includes a first circuit 1, a second circuit 2, and a third circuit 3 as shown in FIG. 1. The power conversion system 10 is a system for performing power conversion between multiple pairs (e.g., four pairs in the example illustrated in FIG. 1) of first DC terminals T11, T12, a single pair of second DC terminals T21, T22, and a single pair of AC terminals T31, T32. A solar battery 70 serving as a DC power supply is electrically connected to each pair of first DC terminals T11, T12. A storage battery 80 serving as either a DC power supply or a DC load is electrically connected to the second DC terminals T21, T22. A power grid 90 serving as either a single-phase AC power supply or a single-phase AC load is electrically connected to the AC terminals T31, T32.

The power conversion system 10 further includes a plurality of (e.g., four in the example illustrated in FIG. 1) fourth circuits 4, a filter circuit 5, a control circuit 6, a snubber circuit 7, and a connection unit 8. The power conversion system 10 may further include the multiple pairs of first DC terminals T11, T12, the single pair of second DC terminals T21, T22, and the single pair of AC terminals T31, T32. Alternatively, the multiple pairs of first DC terminals T11, T12, the single pair of second DC terminals T21, T22, and the single pair of AC terminals T31, T32 do not have to be among constituent elements of the power conversion system 10. Furthermore, as used herein, the "terminal" does not have to be a component to which an electric wire, for example, is connected but may also be a lead of an electronic component or a part of a conductor included in a circuit board, for example.

(2.1) First Circuit

The first circuit 1 may be, for example, a DC/AC converter. Specifically, the first circuit 1 may be a single-phase inverter circuit for converting the DC voltage between terminals 81, 82 (to be described later) into an AC voltage having a rectangular waveform. As shown in FIG. 1, the first circuit 1 includes four first switching elements Q11-Q14, which are bridge-connected together. In addition, the first circuit 1 further includes two first internal terminals 111, 112 and two first external terminals 113, 114.

Each of the first switching elements Q11-Q14 may be, for example, a depletion mode n-channel metal-oxide semiconductor field effect transistor (MOSFET). The first switching element Q11 having the higher potential is electrically connected in series to the first switching element Q12 having the lower potential between the terminals 81 and 82. The first switching element Q13 having the higher potential is electrically connected in series to the first switching element Q14 having the lower potential between the terminals 81 and 82. That is to say, between the terminals 81, 82, a series circuit of the first switching elements Q11, Q12 and a series circuit of the first switching elements Q13, Q14 are electrically connected in parallel with each other.

Each of the first switching elements Q11-Q14 includes a parasitic diode. The parasitic diode of each of the first switching elements Q11-Q14 has its anode electrically connected to the source of an associated one of the first switching elements Q11-Q14 and has its cathode electrically connected to the drain of the associated one of the first switching elements Q11-Q14.

Each of the first switching elements Q11, Q13 having the higher potential has its drain electrically connected to the terminal 81 via the first internal terminal 111. Each of the first switching elements Q12, Q14 having the lower potential has its source electrically connected to the terminal 82 via the first internal terminal 112. Also, the first switching element Q11 having the higher potential has its source electrically connected to the drain of the first switching element Q12 having the lower potential. Likewise, the first switching element Q13 having the higher potential has its source electrically connected to the drain of the first switching element Q14 having the lower potential.

The first switching elements Q11-Q14 turn ON and OFF in response to first drive signals Sig9-Sig12, respectively, supplied from the control circuit 6.

(2.2) Second Circuit

The second circuit 2 may be, for example, a DC/DC converter. Specifically, the second circuit 2 may be a step-up chopper circuit for boosting the DC voltage supplied from the plurality of fourth circuits 4. In addition, the second circuit 2 is also a bidirectional chopper circuit. As shown in FIG. 1, the second circuit 2 includes a capacitor C2, an inductor L1, and two switching elements Q21, Q22. In addition, the second circuit 2 further includes two second internal terminals 211, 212 and two second external terminals 213, 214.

The capacitor C2 is electrically connected between the two fourth internal terminals 411, 412 (to be described later) via the two second external terminals 213, 214. In other words, the capacitor C2 is electrically connected to the plurality of fourth circuits 4 via the two second external terminals 213, 214 and the two fourth internal terminals 411, 412. The capacitor C2 may be, for example, an electrolytic capacitor. The capacitor C2 has the capability of stabilizing the voltage between the second external terminals 213, 214. Alternatively, the capacitor C2 does not have to be one of the constituent elements of the second circuit 2.

Each of the second switching elements Q21, Q22 may be, for example, a depletion mode n-channel MOSFET. The second switching element Q21 having the higher potential is electrically connected in series to the second switching element Q22 having the lower potential between the terminals 81, 82. That is to say, a series circuit of the second switching elements Q21, Q22 is electrically connected between the terminals 81, 82.

Each of the second switching elements Q21, Q22 includes a parasitic diode. The parasitic diode of each of the second switching elements Q21, Q22 has its anode electrically connected to the source of an associated one of the second switching elements Q21, Q22 and has its cathode electrically connected to the drain of the associated one of the second switching elements Q21, Q22.

The second switching element Q21 having the higher potential has its drain electrically connected to the terminal 81 via the second internal terminal 211. The second switching element Q22 having the lower potential has its source electrically connected to the terminal 82 via the second internal terminal 212. Also, the second switching element Q21 having the higher potential has its source electrically connected to the drain of the second switching element Q22 having the lower potential.

The second switching elements Q21, Q22 turn ON and OFF in response to second drive signals Sig13, Sig14, respectively, supplied from the control circuit 6.

The inductor L1 has its first terminal electrically connected to the second external terminal 213. The inductor L1 has its second terminal electrically connected to the node of connection between the second switching elements Q21, Q22.

(2.3) Third Circuit

The third circuit 3 may be, for example, a DC/DC converter. As shown in FIG. 1, the third circuit 3 includes a capacitor C1, a transformer 33, and eight third switching elements Q31-Q38. The third circuit 3 further includes two third internal terminals 341, 342 and two third external terminals 343, 344.

The capacitor C1 is electrically connected between the two second DC terminals T21, T22 via the two third external terminals 343, 344. In other words, the capacitor C1 is connected to the storage battery 80 via the two third external terminals 343, 344 and the two second DC terminals T21, T22. The capacitor C1 may be, for example, an electrolytic capacitor. The capacitor C1 has the capability of stabilizing the voltage between the second DC terminals T21, T22. Alternatively, the capacitor C1 does not have to be one of the constituent elements of the third circuit 3.

Each of the third switching elements Q31-Q38 may be, for example, a depletion mode n-channel MOSFET. The third switching element Q31 is electrically connected in series to the third switching element Q32 across the capacitor C1. The third switching element Q33 is electrically connected in series to the third switching element Q34 across the capacitor C1. That is to say, a series circuit of the third switching elements Q31, Q32 and a series circuit of the third switching elements Q33, Q34 are electrically connected in parallel across the capacitor C1.

The third switching element Q35 is electrically connected in series to the third switching element Q36 between the terminals 81, 82. The third switching element Q37 is electrically connected in series to the third switching element Q38 between the terminals 81, 82. That is to say, a series circuit of the third switching elements Q35, Q36 and a series circuit of the third switching elements Q37, Q38 are electrically connected in parallel between the terminals 81. 82.

Each of the third switching elements Q31-Q38 includes a parasitic diode. The parasitic diode of each of the third switching elements Q31-Q38 has its anode electrically connected to the source of an associated one of the third switching elements Q31-Q38 and has its cathode electrically connected to the drain of the associated one of the third switching elements Q31-Q38.

Each of the third switching elements Q31, Q33 having the higher potential has its drain electrically connected to the second DC terminal T21 via the third external terminal 343. Each of the third switching elements Q32, Q34 having the lower potential has its source electrically connected to the second DC terminal T22 via the third external terminal 344. The third switching element Q31 having the higher potential has its source electrically connected to the drain of the third switching element Q32 having the lower potential. The third switching element Q33 having the higher potential has its source electrically connected to the drain of the third switching element Q34 having the lower potential.

Each of the third switching elements Q35, Q37 having the higher potential has its drain electrically connected to the terminal 81 via the third internal terminal 341. Each of the third switching elements Q36, Q38 having the lower potential has its source electrically connected to the terminal 82 via the third internal terminal 342. The third switching element Q35 having the higher potential has its source electrically connected to the drain of the third switching element Q36 having the lower potential. The third switching element Q37 having the higher potential has its source electrically connected to the drain of the third switching element Q38 having the lower potential.

The third switching elements Q31-Q38 turn ON and OFF in response to third drive signals Sig1-Sig8, respectively, supplied from the control circuit 6.

The transformer 33 includes a primary winding 331 and a secondary winding 332 which are magnetically coupled together. The primary winding 331 has its first terminal electrically connected to the node of connection between the third switching elements Q31, Q32 and has its second terminal electrically connected to the node of connection between the third switching elements Q33, Q34. The secondary winding 332 has its first terminal electrically connected to the node of connection between the third switching elements Q35, Q36 and has its second terminal electrically connected to the node of connection between the third switching elements Q37, Q38. The primary winding 331 and the secondary winding 332 may have a turns ratio of 1:1, for example. The turns ratio of the primary winding 331 and the secondary winding 332 may be changed arbitrarily according to the specification of the power conversion system 10, for example.

The third circuit 3 receives, via the second DC terminals T21, T22, the voltage across the storage battery 80 as an input voltage. In the following description, a circuit including the third switching elements Q31-Q34 and the primary winding 331 of the transformer 33 will be hereinafter referred to as a "primary-side circuit 31" and a circuit including the third switching elements Q35-Q38 and the secondary winding 332 of the transformer 33 will be hereinafter referred to as a "secondary-side circuit 32."

In the third circuit 3, the third switching elements Q31-Q34 of the primary-side circuit 31 turn ON and OFF, thereby converting the input voltage into a radio-frequency AC voltage having a rectangular waveform of 20 kHz, for example, and applying (supplying) the AC voltage to the primary winding 331.

In the third circuit 3, the third switching elements Q35-Q38 of the secondary-side circuit 32 turn ON and OFF, thereby converting an AC voltage having positive and negative polarities and a rectangular waveform and generated on the secondary winding 332 into a DC voltage having positive polarity and outputting the DC voltage between the two terminals 81, 82 of the connection unit 8. In this case, the voltage is supplied between the terminals 81, 82 such that the terminal 81 has the higher potential (positive electrode) and the terminal 82 has the lower potential (negative electrode) out of the two terminals 81, 82.

Optionally, a capacitor may be electrically connected between the drain and source of each of the third switching elements Q31-Q34. In that case, the capacitor produces resonance with the primary winding 331, thereby making soft switching of the third switching elements Q31-Q38. Alternatively, the capacitor may be electrically connected to the primary winding 331 in parallel.

(2.4) Fourth Circuit

Each of the plurality of fourth circuits 4 may be, for example, a DC/DC converter. Specifically, each of the fourth circuits 4 is implemented as a step-up chopper circuit for boosting the DC voltage supplied from the solar battery 70. As shown in FIG. 1, each of the fourth circuits 4 includes two capacitors C41, C42, an inductor L41, and two fourth switching elements Q41, Q42. In addition, each of the fourth circuits 4 further includes two fourth internal terminals 411, 412 and two fourth external terminals 413, 414.

The capacitor C41 is electrically connected between the two first DC terminals T11, T12 via the two fourth external terminals 413, 414. In other words, the capacitor C41 is electrically connected to the solar battery 70 via the two fourth external terminals 413, 414 and the two first DC terminals T11, T12. The capacitor C41 may be, for example, an electrolytic capacitor. The capacitor C41 has the capability of stabilizing the voltage between the first DC terminals T11, T12. Alternatively, the capacitor C41 does not have to be one of the constituent elements of the fourth circuit 4.

The capacitor C42 is electrically connected between the two second external terminals 213, 214 via the two fourth internal terminals 411, 412. In other words, the capacitor C42 is electrically connected to the second circuit 2 via the two fourth internal terminals 411, 412 and the two second external terminals 213, 214. The capacitor C42 may be, for example, an electrolytic capacitor. The capacitor C42 has the capability of stabilizing the voltage between the fourth internal terminals 411, 412. Alternatively, the capacitor C42 does not have to be one of the constituent elements of the fourth circuit 4.

Each of the fourth switching elements Q41, Q42 may be, for example, a depletion mode n-channel MOSFET. The fourth switching element Q41 having the higher potential is electrically connected in series to the fourth switching element Q42 having the lower potential across the capacitor C42. That is to say, a series circuit of the fourth switching elements Q41, Q42 is electrically connected across the capacitor C42.

Each of the fourth switching elements Q41, Q42 includes a parasitic diode. The parasitic diode of each of the fourth switching elements Q41, Q42 has its anode electrically connected to the source of an associated one of the fourth switching elements Q41, Q42 and has its cathode electrically connected to the drain of the associated one of the fourth switching elements Q41, Q42.

The fourth switching element Q41 having the higher potential has its drain electrically connected to the first terminal (high-potential terminal) of the capacitor C42. The fourth switching element Q42 having the lower potential has its source electrically connected to the second terminal of the capacitor C42 (i.e., terminal on the negative electrode side). Also, the fourth switching element Q41 having the higher potential has its source electrically connected to the drain of the fourth switching element Q42 having the lower potential.

The fourth switching elements Q41, Q42 turn ON and OFF in response to fourth drive signals Sig15, Sig16, respectively, supplied from the control circuit 6.

The inductor L41 has its first terminal electrically connected to the fourth external terminal 413. The inductor L41 has its second terminal electrically connected to the node of connection between the fourth switching elements Q41, Q42. Note that in the following description, when there is no need, in particular, to distinguish the first drive signals Sig9-Sig12, the second drive signals Sig13, Sig 14, the third drive signals Sig1-Sig8, and the fourth drive signals Sig15, Sig 16 from each other, these drive signals will be hereinafter collectively referred to as "drive signals Sig1-Sig 16."

In the following description of the power conversion system 10 according to this embodiment, the plurality of fourth circuits 4 are supposed to be housed in the single housing (booster case). However, the plurality of fourth circuits 4 do not have to be housed in the single housing. Therefore, the plurality of fourth circuits 4 may be separately housed in their individual housings.

(2.5) Filter Circuit

The filter circuit 5 smooths out an AC voltage having a rectangular waveform and supplied from the first circuit 1. Thus, the AC voltage having the rectangular waveform and supplied from the first circuit 1 is converted into an AC voltage having a sinusoidal waveform and an amplitude corresponding to its pulse width.

Specifically, the filter circuit 5 includes a plurality of (e.g., two in the example illustrated in FIG. 1) inductors L51, L52 and a capacitor C51. The inductor L51 has its first terminal electrically connected to the node of connection between the first switching elements Q11, Q12 via the first external terminal 113 and has its second terminal electrically connected to the AC terminal T31. The inductor L52 has its first terminal electrically connected to the node of connection between the first switching elements Q13, Q14 via the first external terminal 114 and has its second terminal electrically connected to the AC terminal T32. The capacitor C51 is electrically connected between the AC terminals T31, T32.

In other words, the node of connection between the first switching elements Q11, Q12 is electrically connected to the AC terminal T31 via the inductor L51. The node of connection between the first switching elements Q13, Q14 is electrically connected to the AC terminal T32 via the inductor L52.

(2.6) Control Circuit

The control circuit 6 is implemented as, for example, a microcomputer including a processor and a memory. That is to say, the control circuit 6 is implemented as a computer system including a processor and a memory. The computer system performs the function of the control circuit 6 by making the processor execute an appropriate program. The program may be stored in advance in the memory. Alternatively, the program may also be downloaded via a telecommunications line such as the Internet or distributed after having been stored in a non-transitory storage medium such as a memory card.

The control circuit 6 is configured to control each of the first circuit 1, the second circuit 2, the third circuit 3, and the plurality of fourth circuits 4. The control circuit 6 outputs the first drive signals Sig9-Sig12 for driving the first switching elements Q11-Q14, respectively, to the first circuit 1. The control circuit 6 outputs the second drive signals Sig13, Sig14 for driving the second switching elements Q21, Q22, respectively, to the second circuit 2. The control circuit 6 outputs the third drive signals Sig1-Sig8 for driving the third switching elements Q31-Q38, respectively, to the third circuit 3. The control circuit 6 outputs the fourth drive signals Sig15, Sig16 for driving the fourth switching elements Q41, Q42, respectively, to each of the fourth circuits 4. Each of the drive signals Sig1-Sig16 is a PWM signal, which is a binary signal that switches between high level (an exemplary active value) and low level (an exemplary inactive value).

(2.7) Snubber Circuit

The snubber circuit 7 is electrically connected to the terminals 81, 82. That is to say, the snubber circuit 7 is electrically connected to the transformer 33 of the third circuit 3.

The snubber circuit 7 is a regenerative snubber circuit for absorbing electrical energy from the terminals 81, 82 of the connection unit 8 and injecting (regenerating) electrical energy into the terminals 81, 82. When a bus voltage between the terminals 81, 82 exceeds a first clamp value, the snubber circuit 7 absorbs part of the electrical energy in excess of the first clamp value from the terminals 81, 82, thereby clamping an upper limit value of the bus voltage at the first clamp value. Also, when the bus voltage becomes lower than a second clamp value (<the first clamp value), the snubber circuit 7 injects (regenerates) the electrical energy into the terminals 81, 82, thereby clamping the lower limit value of the bus voltage at the second clamp value.

The snubber circuit 7 includes a plurality of (e.g., two in the example illustrated in FIG. 1) diodes D1, D2, a resistor R1, and a plurality of (e.g., two in the example illustrated in FIG. 1) capacitors C71, C72 as shown in FIG. 1. The diode D1 is electrically connected in series to the capacitor C71 between the terminals 81, 82. The diode D2 is electrically connected in series to the capacitor C72 between the terminals 81, 82. The diode D1 has its anode electrically connected to the terminal 81 and has its cathode electrically connected to the terminal 82 via the capacitor C71. The diode D2 has its anode electrically connected to the terminal 82 via the capacitor C72 and has its cathode electrically connected to the terminal 81. That is to say, the diodes D1 and D2 are connected in mutually opposite directions between the terminals 81, 82. The resistor R1 is electrically connected between the node of connection of the diode D1 and the capacitor C71 and the node of connection of the diode D2 and the capacitor C72.

In the snubber circuit 7, when the bus voltage exceeds the first clamp value, the electrical energy absorbed from the terminals 81, 82 is stored in the capacitor C71. The electrical energy stored in the capacitor C71 is transmitted to the capacitor C72 via the resistor R1. If the bus voltage is lower than the second clamp value, the electrical energy stored in the capacitor C72 is regenerated at the terminals 81, 82 via the diode D2.

(2.8) Connection Unit

To the connection unit 8, the first circuit 1 is electrically connected via the first internal terminals 111, 112 as shown in FIG. 1. In addition, to the connection unit 8, the second circuit 2 is also electrically connected via the second internal terminals 211, 212. Furthermore, to the connection unit 8, the third circuit 3 is also electrically connected via the third internal terminals 341, 342. In other words, the first internal terminals 111, 112 of the first circuit 1, the second internal terminals 211, 212 of the second circuit 2, and the third internal terminals 341, 342 of the third circuit 3 are all electrically connected to the same connection unit 8. That is to say, in the power conversion system 10 according to this embodiment, the first circuit 1, the second circuit 2, and the third circuit 3 are electrically connected on the DC side.

The connection unit 8 includes the terminals 81, 82 as shown in FIG. 1. In addition, the secondary-side circuit 32 of the third circuit 3 operates to make the voltage at the terminal 81 positive with respect to the terminal 82 (i.e., to allow the terminal 81 to have a higher potential than the terminal 82). To the connection unit 8, electrically connected is the snubber circuit 7 described above.

(3) Operation

Next, it will be described with reference to FIGS. 2-5D how the power conversion system 10 according to this embodiment operates.

(3.1) Basic Operation

First, a basic operation of the power conversion system 10 according to this embodiment will be described with reference to FIG. 2.

The power conversion system 10 according to this embodiment converts (transmits) power bidirectionally between the multiple pairs of first DC terminals T11, T12, the second DC terminals T21, T22, and the AC terminals T31, T32. That is to say, the power conversion system 10 has an inverter mode and a converter mode as two operation modes thereof. As used herein, the inverter mode refers to a mode in which the DC power supplied to the multiple pairs of first DC terminals T11, T12 and the second DC terminals T21, T22 is converted into single-phase AC power, which is then output through the AC terminals T31, T32. The converter mode refers herein to a mode in which the single-phase AC power supplied to the AC terminals T31, T32 is converted into DC power, which is then output through the second DC terminals T21, T22.

In other words, the inverter mode herein refers to a mode in which between the AC terminals T31, T32, a voltage drop is caused in the same direction as the direction in which a current flows through the power grid 90, i.e., a mode in which a voltage and a current of the same polarity are generated. On the other hand, the converter mode herein refers to a mode in which between the AC terminals T31, T32, a voltage drop is caused in the opposite direction from the direction in which a current flows through the power grid 90, i.e., a mode in which a voltage and a current of opposite polarities are generated.

In the following description, a situation where the power conversion system 10 operates in the inverter mode to convert DC power into single-phase AC power with a frequency of 50 Hz or 60 Hz will be described as an example. Also, in the following description, a situation where the second switching elements Q21, Q22 have a drive frequency of 40 kHz, the third switching elements Q31-Q38 have a drive frequency of 20 kHz, and the fourth switching elements Q41, Q42 have a drive frequency of 10 kHz will be described as an example.

Figure 2:
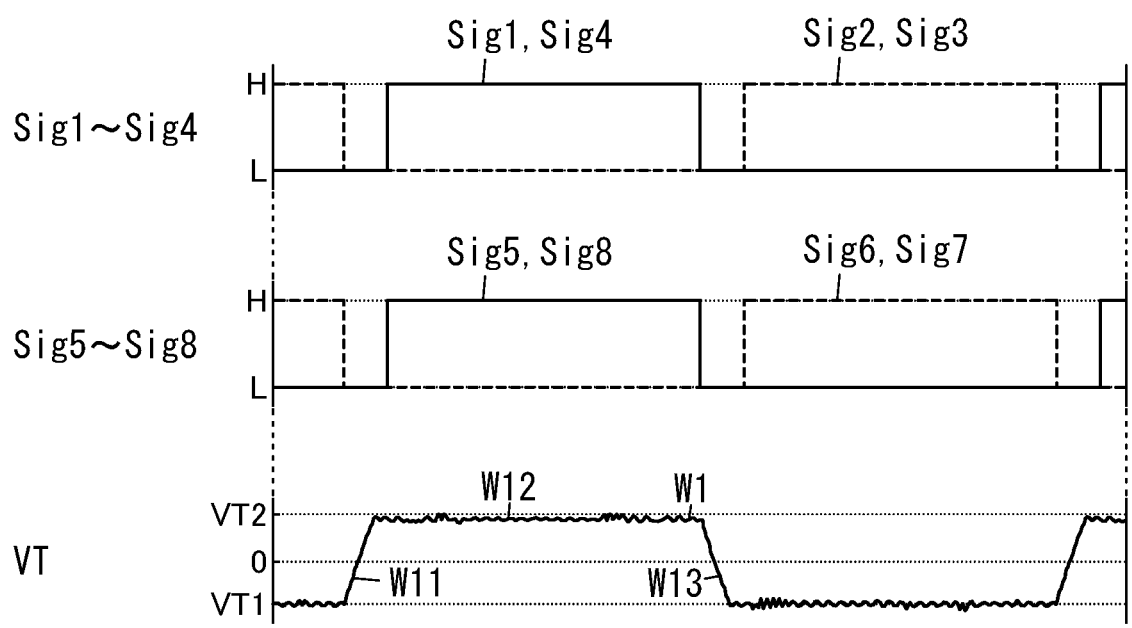
FIG. 2 is a waveform chart showing how the power conversion system operates.

FIG. 2 is a waveform chart showing how the power conversion system 10 according to this embodiment operates in the inverter mode. In FIG. 2, the abscissa indicates the time. Also, in FIG. 2, the respective waveforms of the third drive signals Sig1-Sig4, the third drive signals Sig5-Sig8, and the output voltage VT are shown from top to bottom in this order. As used herein, the output voltage VT refers to a voltage generated across the secondary winding 332 of the transformer 33.

As for the drive signals Sig1-Sig8, their high level is denoted by "H" and their low level is denoted by "L" in FIG. 2. Each of the third switching elements Q31-Q38 turns ON when its associated drive signal Sig1-Sig8 is high and turns OFF when its associated drive signal Sig1-Sig8 is low.

The control circuit 6 controls each of the fourth circuits 4 such that the fourth switching elements Q41, Q42 thereof alternately turn ON and OFF. While the fourth switching element Q41 is ON and the fourth switching element Q42 is OFF, a voltage with positive polarity is applied between the fourth internal terminals 411, 412. On the other hand, while the fourth switching element Q41 is OFF and the fourth switching element Q42 is ON, the electrical energy generated by the solar battery 70 is stored in the inductor L41 via the fourth switching element Q42. The output voltage of each of the fourth circuits 4 is applied between the second external terminals 213, 214 of the second circuit 2.

The control circuit 6 controls the second circuit 2 such that the second switching elements Q21, Q22 thereof alternately turn ON and OFF. While the second switching element Q21 is ON and the second switching element Q22 is OFF, a voltage with positive polarity is applied between the second internal terminals 211, 212. On the other hand, while the second switching element Q21 is OFF and the second switching element Q22 is ON, the electrical energy supplied from the plurality of fourth circuits 4 is stored in the inductor L1 via the second switching element Q22.

The control circuit 6 controls the switching elements Q31-Q34 of the third circuit 3 such that a positive voltage and a negative voltage are alternately applied to the primary winding 331. In addition, the control circuit 6 also controls the third switching elements Q35-Q38 to make the voltage at the terminal 81 positive with respect to the terminal 82.

Specifically, the control circuit 6 turns the third switching elements Q32, Q33 OFF while the third switching elements Q31, Q34 are ON. The control circuit 6 turns the third switching elements Q32, Q33 ON while the third switching elements Q31, Q34 are OFF. In this case, the control circuit 6 controls the third switching elements Q31-Q34 at the same duty cycle. In this embodiment, the duty cycle of the third switching elements Q31-Q34 is set at 0.5 (substantially 50%).

In addition, the control circuit 6 controls the third switching elements Q31-Q34 such that a radio frequency AC voltage is supplied to the primary winding 331 and the secondary winding 332 and also controls the switching elements Q35-Q38 such that a voltage with positive polarity is supplied to the terminals 81, 82.

Specifically, the control circuit 6 operates to repeatedly go through the first through fourth modes to be described below.

In the first mode, the control circuit 6 outputs the third drive signals Sig1-Sig8 to the third circuit 3 such that the third switching elements Q31, Q34, Q35, Q38 turn ON and the third switching elements Q32, Q33, Q36, Q37 turn OFF. In addition, in the first mode, the control circuit 6 outputs the second drive signals Sig13, Sig14 to the second circuit 2 such that the second switching element Q21 turns ON and the second switching element Q22 turns OFF. As a result, a voltage having positive polarity is supplied (applied) to the terminals 81, 82.

In the second mode, the control circuit 6 outputs the first drive signals Sig9-Sig12 to the first circuit 1 such that the first switching elements Q12, Q14 having the lower potential turn OFF and the first switching elements Q11, Q13 having the higher potential turn ON. This changes the operation mode into a first circulation mode in which a current circulates in the first circuit 1.

In addition, in the second mode, the control circuit 6 outputs the second drive signals Sig13, Sig14 to the second circuit 2 such that the second switching element Q21 having the higher potential turns OFF and the second switching element Q22 having the lower potential turns ON. This changes the operation mode into a second circulation mode in which a current circulates in the second circuit 2. At this time, the third switching elements Q31-Q38 of the third circuit 3 are all OFF.

In the third mode, the control circuit 6 outputs the third drive signals Sig1-Sig8 to the third circuit 3 such that the third switching elements Q32, Q33, Q36, Q37 turn ON and the third switching elements Q31, Q34, Q35, Q38 turn OFF. In addition, in the third mode, the control circuit 6 outputs the second drive signals Sig13, Sig14 to the second circuit 2 such that the second switching element Q21 turns ON and the second switching element Q22 turns OFF. As a result, a voltage having positive polarity is supplied (applied) to the terminals 81, 82.

In the fourth mode, the control circuit 6 outputs the first drive signals Sig9-Sig12 to the first circuit 1 such that the first switching elements Q12, Q14 having the lower potential turn ON and the first switching elements Q11, Q13 having the higher potential turn OFF. This changes the operation mode into a first circulation mode in which a current circulates in the first circuit 1.

In addition, in the fourth mode, the control circuit 6 outputs the second drive signals Sig13, Sig14 to the second circuit 2 such that the second switching elements Q21 having the higher potential turns OFF and the second switching element Q22 having the lower potential turns ON. This changes the operation mode into a second circulation mode in which a current circulates in the second circuit 2. At this time, the third switching elements Q31-Q38 of the third circuit 3 are all OFF.

The control circuit 6 repeatedly performs the operations in the first, second, third, and fourth modes in this order. As a result, a voltage having positive polarity is supplied (applied) to the terminals 81, 82 (connection unit 8).

In the third circuit 3, an output voltage VT having a rectangular waveform is applied across the secondary winding 332 of the transformer 33 (see FIG. 2) by controlling the third switching elements Q31-Q38 as described above. Specifically, the waveform W1 of the output voltage VT includes a rising range W11, a falling range W13, and a flat range W12. In the rising range W11, the output voltage VT increases proportionately (changes) from a first potential VT1 to a second potential VT2 (>VT1) higher than the first potential VT1 as shown in FIG. 2. In the falling range W13, the output voltage VT decreases proportionately (changes) from the second potential VT2 to the first potential VT1 as shown in FIG. 2. In the flat range W12, the output voltage VT is maintained at either the first potential VT1 or the second potential VT2 as shown in FIG. 2. Also, in the power conversion system 10 according to this embodiment, a DC voltage corresponding to the flat range W12 of the output voltage VT generated across the secondary winding 332 is applied (supplied) to the terminals 81, 82 of the connection unit 8.

That is to say, the power conversion system 10 according to this embodiment allows a DC voltage corresponding to the flat range W12 of the output voltage VT to be generated in the connection unit 8, thus enabling the first circuit 1 and the second circuit 2 to be connected on the DC side even without using any smoothing capacitor. As used herein, if a waveform range is "flat," then the waveform range may naturally be flat in its entirety but may also have subtle variations at least locally. Thus, even if the flat range W12 of the waveform W1 of the output voltage VT has some subtle variations, the flat range W12 may also be herein regarded as being flat.

(3.2) Ripple Control

If the power grid 90 serving as either a single-phase AC power supply or a single-phase AC load is connected to the first circuit 1 as in the power conversion system 10 according to this embodiment, then the power ripples caused by the power grid 90 may affect the second circuit 2 and third circuit 3 that are electrically connected to the first circuit 1 on the DC side. In this case, the AC power supplied by the power grid 90 needs to have a power factor greater than 0.95, and therefore, the AC power pulsates at double the frequency of the commercial frequency.

In this case, if the second circuit 2 electrically connected to the solar battery 70 is performing maximum power point tracking (MPPT), for example, then a constant current is output from the second circuit 2. This causes the power ripples caused by the power grid 90 to be input to the third circuit 3. These power ripples may be reduced by connecting a capacitor having a large capacitance to an input section of the third circuit 3, i.e., between the terminals 81, 82. In that case, however, the capacitor should have its capacitance increased in the commercial frequency range, which is a problem.

Figure 3A:
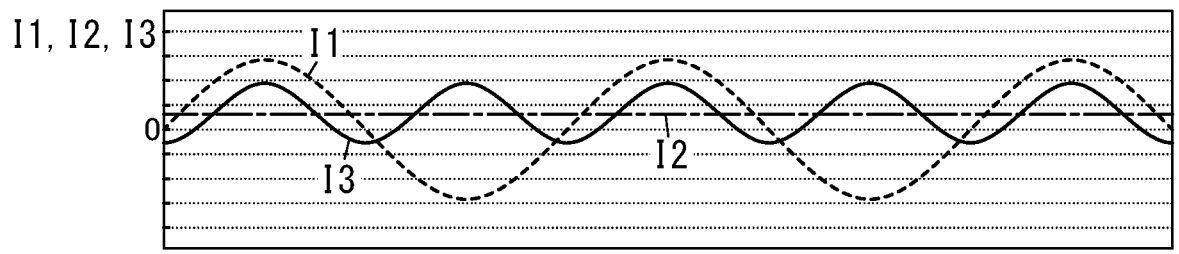
FIGS. 3A-3D show waveforms used when only a third circuit takes charge of power ripples caused in the power conversion system.
Figure 3B:
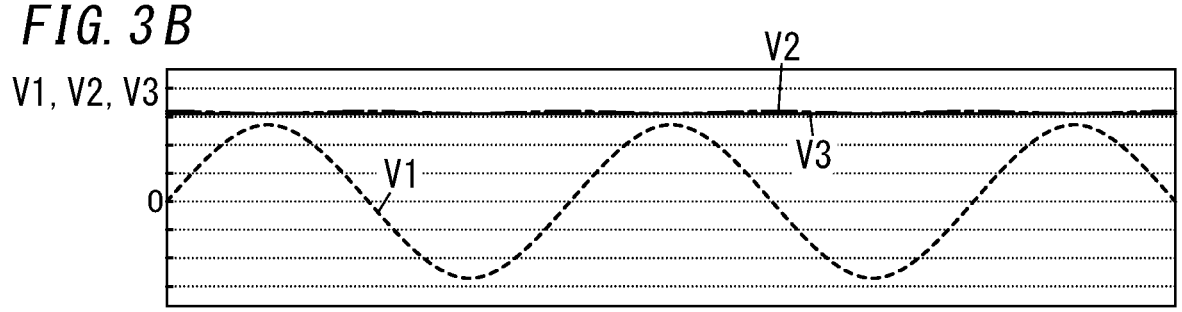
Figure 3C:
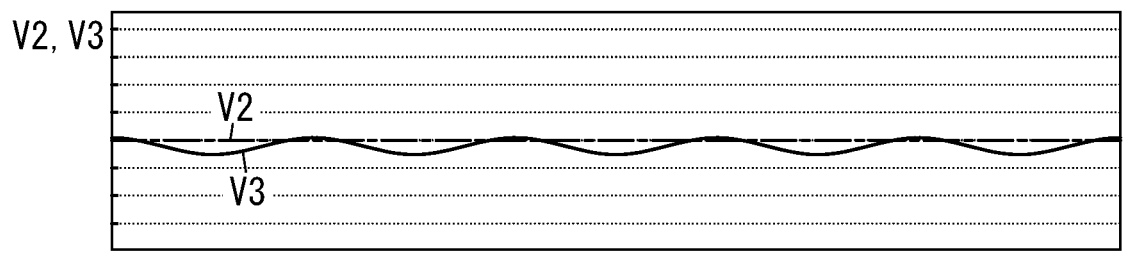
Figure 3D:
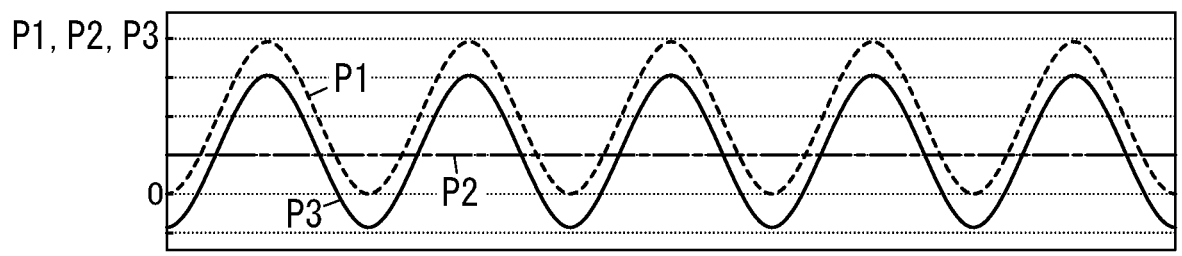

FIGS. 3A-3D show waveforms obtained in a situation where the second circuit 2 is performing a constant current control, i.e., when only the third circuit 3 is in charge of the power ripples caused by the first circuit 1. In FIGS. 3A-3D, the abscissa indicates the time. FIG. 3A shows the waveforms of a first output current I1, a second output current I2, and a third output current I3. FIG. 3B shows the waveforms of the first, second, and third voltages V1, V2, V3 across the capacitors C51, C2, C1. FIG. 3C shows, on a larger scale, a part of the waveforms shown in FIG. 3B. FIG. 3D shows the waveforms of first power P1, second power P2, and third power P3. The first output current I1 is a current output from the first circuit 1 to the power grid 90. The second output current I2 is a current output from the second circuit 2 to the terminal 81. The third output current I3 is a current output from the storage battery 80 to the third circuit 3. The first voltage V1 is the voltage across the capacitor C51 of the filter circuit 5. The second voltage V2 is the voltage across the capacitor C2 of the second circuit 2. The third voltage V3 is the voltage across the capacitor C1 of the third circuit 3.

As can be seen from FIG. 3A, the second circuit 2 is performing a constant current control and the second output current I2 is constant. On the other hand, the third output current I3 is affected by power ripples and varies in synch with the power ripples of the output of the first circuit 1. Also, as can be seen from FIGS. 3B and 3C, the second and third voltages V2 and V3 across the capacitors C2, C1 are both substantially constant. As a result, while the second power P2 is substantially constant, the third power P3 varies in synch with the first power P1 (see FIG. 3D). That is to say, in this case, only the third circuit 3 is affected by the power ripples. Note that the effect of the power ripples on the third circuit 3 may be reduced if a current control may be performed on the third circuit 3. Actually, however, the third circuit 3 includes no inductors (except the transformer 33), and therefore, cannot be subjected to a current control. As for the third circuit 3, the instantaneous power (third power) P3 includes ripples but the third voltage V3 across the capacitor C1 is a DC voltage. As a result, the third output current I3 includes ripples.

In this case, a maximum allowable current is defined for the storage battery 80 and varies according to the residual capacity (hereinafter referred to as "SOC") of the storage battery 80, the degree of deterioration (hereinafter referred to as an "SOH"), and the temperature of the storage battery 80, for example. In general, if SOC is less than 20% or equal to or greater than 80% or if the temperature of the storage battery 80 is high, then the maximum allowable current becomes low. Therefore, if a ripple current is superposed on the third output current I3 in such a situation, the maximum allowable current of the storage battery 80 will be exceeded, thus eventually causing a decline in the allowable power of the storage battery 80.

Furthermore, unless the power factor of the first circuit 1 is equal to 1, then the phase of the first output current I1 shifts from the phase of the first voltage V1 across the capacitor C51. For example, if the power factor of the first circuit 1 is 0, then there will be a phase shift of 90 degrees between the first output current I1 and the first voltage V1 across the capacitor C51 (see FIG. 6). Thus, if the power factor of the first circuit 1 varies, either the second output current I2 or the second power P2 of the second circuit 2 needs to be controlled in view of the power ripples of the first circuit 1.

Therefore, in a configuration in which the first circuit 1 connected to the power grid 90 and the third circuit 3 connected to the storage battery 80 are connected on the DC side as in the power conversion system 10 according to this embodiment, the effect of power ripples on the third circuit 3 is suitably reduced. The power conversion system 10 according to this embodiment controls the second output current I2 of the second circuit 2 to reduce the effect of power ripples on the third circuit 3. In other words, the power conversion system 10 according to this embodiment is configured to make the second circuit 2 and the third circuit 3 take charge of the power ripples caused by the power grid 90.

Figure 4A:
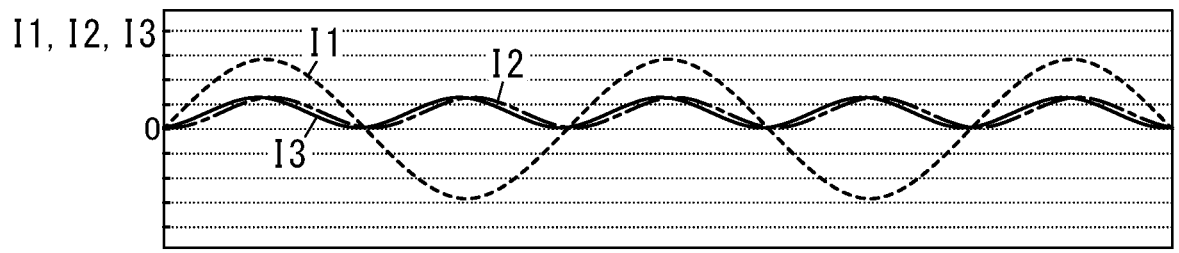
FIGS. 4A-4D show waveforms used when a second circuit and the third circuit take charge of the power ripples caused in the power conversion system.
Figure 4B:
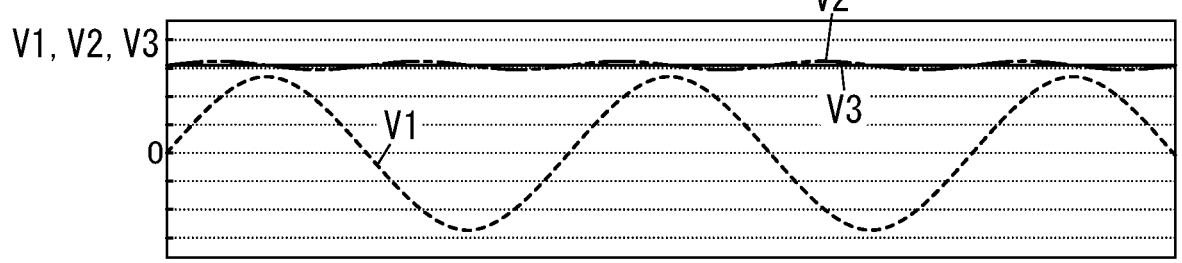
Figure 4C:
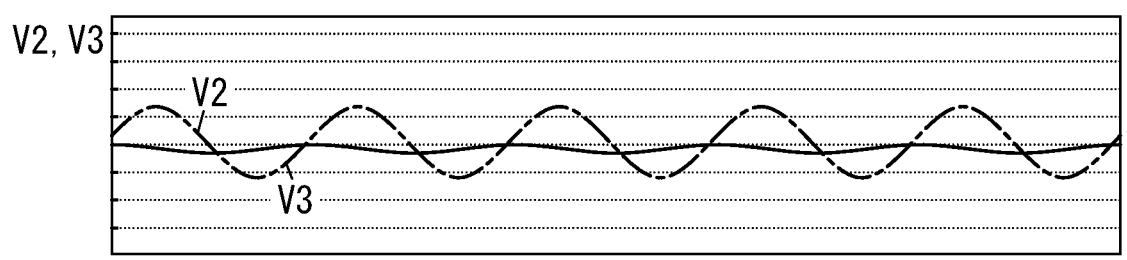

Specifically, the control circuit 6 controls the ON/OFF states of the second switching elements Q21, Q22 such that the second output current I2 varies along with the power ripples of the first circuit 1 as shown in FIG. 4A. In other words, the control circuit 6 controls the ON/OFF states of the second switching elements Q21, Q22 to synchronize the first output current I1 and the second output current I2 with each other. In this case, the amplitude of the second output current I2 is obtained as the product of the amplitude of the first output current I1 and a contribution coefficient. As used herein, the "contribution coefficient" refers to the ratio at which the second circuit 2 takes charge of the power ripples caused by the power grid 90 and has a value falling within the range from 0 to 1. If the contribution coefficient is 0, the second circuit 2 does not take charge of the power ripples caused by the power grid 90, and therefore, only the third circuit 3 takes charge of the power ripples. On the other hand, if the contribution coefficient is 1, then only the second circuit 2 takes charge of the power ripples caused by the power grid 90 and the third circuit 3 does not take charge of the power ripples. If the contribution coefficient is 0.5, then the second circuit 2 and the third circuit 3 evenly take charge of the power ripples caused by the power grid 90. In the example shown in FIGS. 4A-4D, the contribution coefficient is 0.5.

Figure 4D:
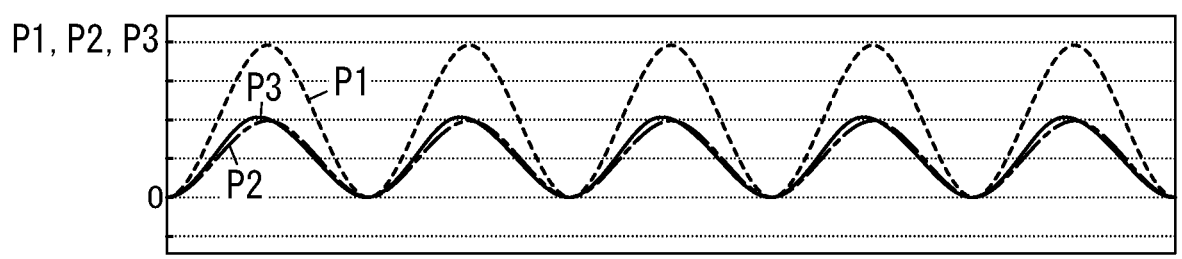

As described above, controlling the second output current I2 enables the second circuit 2 to take charge of at least part of the power ripples caused by the power grid 90, thus allowing the third circuit 3 to have a lower contribution coefficient of the power ripples. As a result, the ripples of the third circuit 3 decrease as shown in FIG. 4A, thus reducing the chances of the third output current I3 exceeding the maximum allowable current of the storage battery 80 and thereby curbing a decline in the allowable power of the storage battery 80. In addition, making the second circuit 2 take charge of the power ripples of the first circuit 1 as shown in FIG. 4D allows reducing the variation in the third power P3.

Figure 5A:
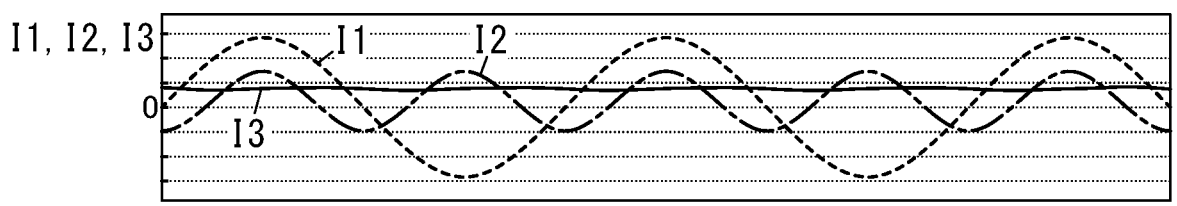
FIGS. 5A-5D show waveforms used when only the second circuit takes charge of the power ripples caused in the power conversion system.
Figure 5B:
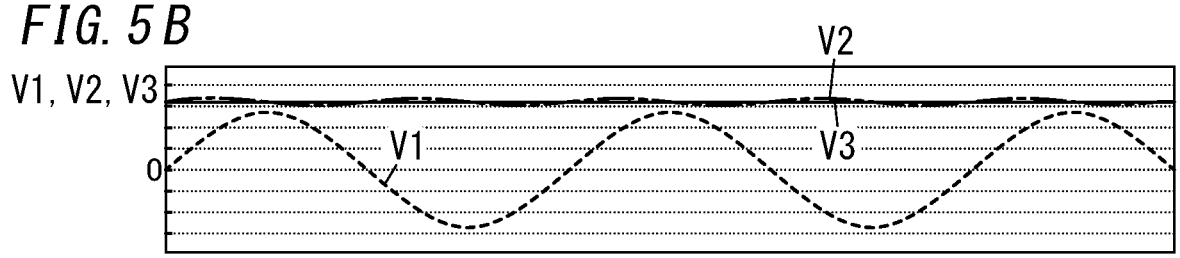
Figure 5C:
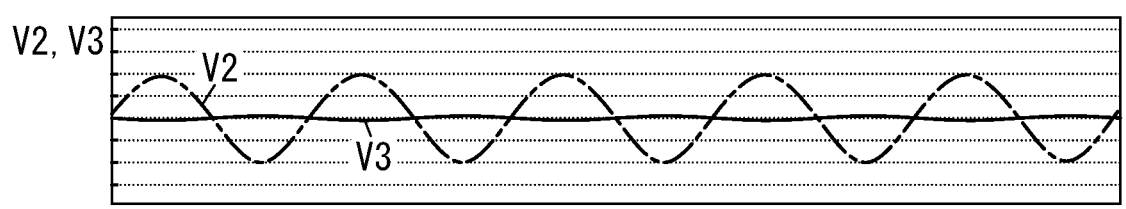
Figure 5D:
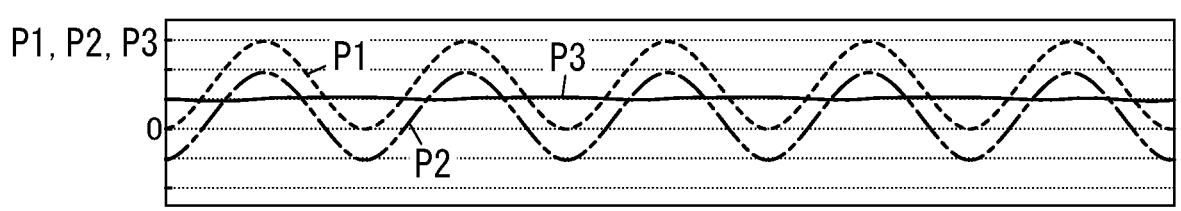

FIGS. 5A-5D show waveforms obtained in a situation where the second circuit 2 takes charge of 100% of the power ripples caused by the power grid 90. In that case, as shown in FIG. 5A, the second output current I2 of the second circuit 2 varies along with the power ripples of the first circuit 1. On the other hand, the third output current I3 of the third circuit 3 hardly varies. Meanwhile, the second voltage V2 across the capacitor C2 varies along with the power ripples of the first circuit 1 as shown in FIGS. 5B and 5C. On the other hand, the third voltage V3 across the capacitor C1 hardly varies. As a result, while the third power P3 hardly varies, the second power P2 varies along with the power ripples of the first circuit 1 as shown in FIG. 5D. That is to say, in this case, only the second circuit 2 takes charge of the power ripples of the first circuit 1.

FIG. 5D shows the results of control which was carried out using an input current on the supposition that the input voltages of the second circuit 2 and the third circuit 3 were perfect DC voltages not pulsating at all. Actually, however, pulsating components are superposed on the input voltage as shown in FIGS. 5B and 5C, thus generating pulsating components on the input current and the input power against the theory. Nevertheless, providing an additional smoothing capacitor for either the input capacitors C1, C2 of the second circuit 2 and the third circuit 3 or the connection unit 8 to increase their capacitance enables the pulsating component to be reduced (to 0 in theory). In addition, pulsation is caused by power ripples on the AC side. Therefore, monitoring and controlling the power ripples such that the power ripples on the input and output ends go zero allows reducing the power ripples on the input and output ends to zero without increasing the capacitance of the capacitor unnecessarily. This allows reducing the capacitance of the input capacitors C1, C2 of the second circuit 2 and the third circuit 3 or the capacitance of the capacitor of the connection unit 8. Thus, this advantage is achievable even if the connection unit 8 of this embodiment includes no capacitors.

If the storage battery 80 has an SOC equal to or greater than 20% and equal to or less than 80%, then the second circuit 2 suitably controls the second output current I2 such that the third circuit 3 has a larger power ripple sharing ratio than the second circuit 2. That is to say, in that case, the contribution coefficient is suitably less than 0.5. If the storage battery 80 has an SOC equal to or greater than 20% and equal to or less than 80%, then the maximum allowable current increases relatively, thus allowing the third circuit 3 to have a larger sharing ratio than the second circuit 2. In addition, setting the sharing ratio to the third circuit 3 at a value larger than the sharing ratio to the second circuit 2 allows reducing the effect of the power ripples on the second circuit 2 to bring the control closer toward the MPPT control.

On the other hand, if the storage battery 80 has an SOC less than 20% or greater than 80%, then the second circuit 2 suitably controls the second output current I2 such that the third circuit 3 has a smaller power ripple sharing ratio than the second circuit 2. That is to say, in that case, the contribution coefficient is suitably greater than 0.5. If the storage battery 80 has an SOC less than 20% or greater than 80%, then the maximum allowable current decreases relatively as described above. Thus, a decline in the allowable power of the storage battery 80 may be curbed by increasing the power ripple sharing ratio to the second circuit 2.

As can be seen, the second circuit 2 controls the second output current I2 such that the power ripple sharing ratio to the third circuit 3 in a situation where the storage battery 80 has a residual capacity less than 20% or greater than 80% is smaller than the power ripple sharing ratio to the third circuit 3 in a situation where the storage battery 80 has a residual capacity equal to or greater than 20% and equal to or less than 80%.

Meanwhile, if the fourth circuit 4 electrically connected to the second circuit 2 is provided as in the power conversion system 10 according to this embodiment, then the second circuit 2 suitably controls the second output current I2 such that the power ripple sharing ratio to the second circuit 2 is greater than the sum of the power ripple sharing ratio to the third circuit 3 and the power ripple sharing ratio to the fourth circuit 4. This configuration allows reducing the power ripple sharing ratios to the third circuit 3 and the fourth circuit 4. Particularly when the fourth circuit 4 is made to perform a constant current control such that the power ripple sharing ratio to the fourth circuit 4 becomes zero, the MPPT control may be performed with the effect of the power ripples on the third circuit 3 reduced.

Furthermore, in the example shown in FIG. 4D, the second power P2 of the second circuit 2 varies in a range over zero. Alternatively, the second power P2 may also be made to vary to cross zero by increasing the contribution coefficient. Still alternatively, the second power P2 may also be made to vary to cross zero and go negative by further increasing the contribution coefficient. In this embodiment, the second circuit 2 is implemented as a synchronous rectifying step-up chopper circuit. Thus, when the second power P2 is negative, the second output current I2 flows in the opposite direction from the one shown in FIG. 1.

Furthermore, if the second circuit 2 is implemented as a bidirectional chopper circuit as in this embodiment, negative power may be output. Therefore, even if the output power of the plurality of fourth circuits 4 is zero, for example, the power ripple of the first circuit 1 may still be taken charge of by causing a sink current to flow toward the second circuit 2.

Figure 6:
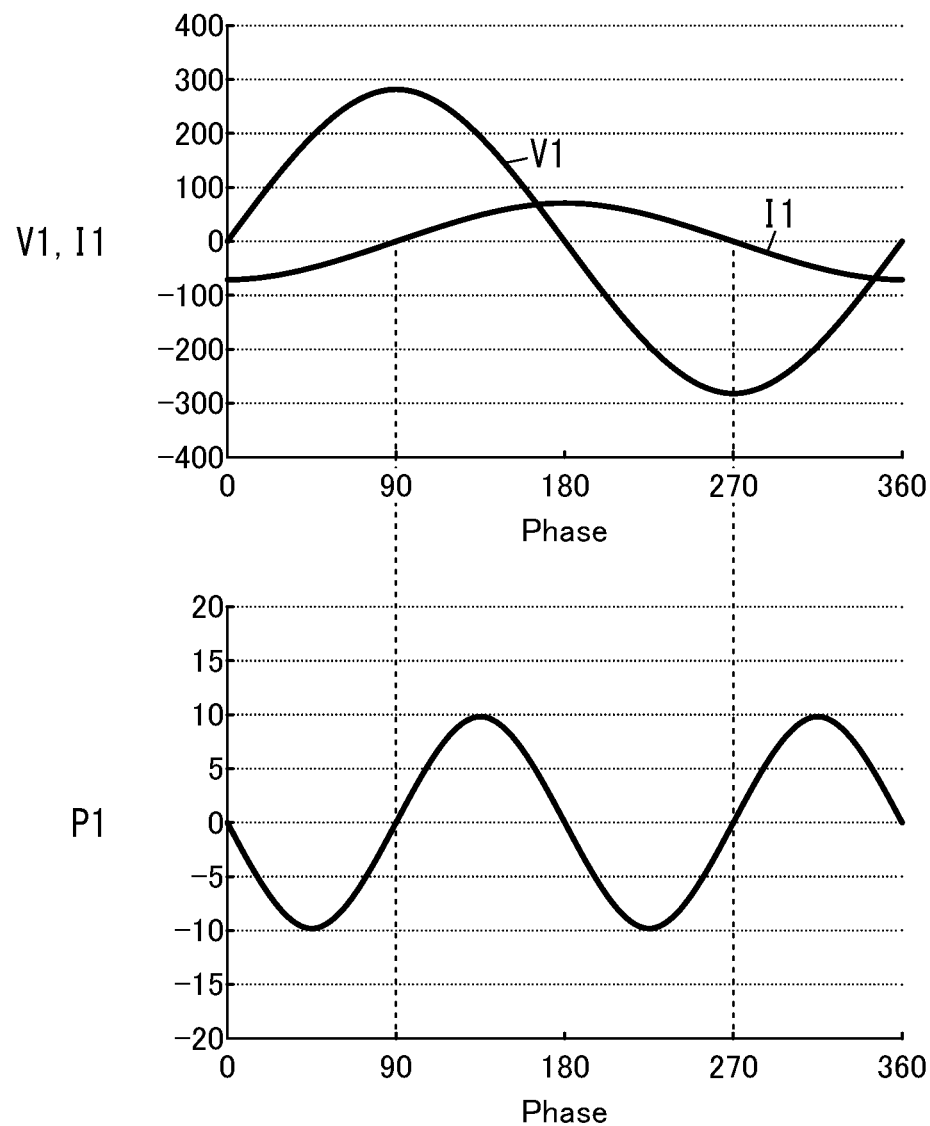
FIG. 6 shows the waveforms of a current, voltage, and power in a first circuit of the power conversion system.

FIG. 6 shows the waveforms of the first voltage V1 across the capacitor C51, the first output current I1, and the first power P1 of the first circuit 1 in the power conversion system 10 according to this embodiment. In the example shown in FIG. 6, the first circuit 1 has a power factor of zero. If the power factor of the first circuit 1 varies, the phase of the first output current I1 shifts with respect to the phase of the first voltage V1 across the capacitor C51 and the phase of the first power P1 also shifts accordingly. Therefore, when the power factor of the first circuit 1 varies, the first output current I1 and the first power P1 are in phase with each other. Thus, the second output current I2 or the second power P2 of the second circuit 2 may be controlled by reference to the waveform of the first output current I1. Alternatively, the second output current I2 or the second power P2 may be controlled by reference to the waveform of the first power P1. On the other hand, if the first voltage V1 across the capacitor C51 comes to have a distorted waveform, for example, then the first power P1 also comes to have a distorted waveform but the first output current I1 does not come to have a distorted waveform. In view of these considerations, the power conversion system 10 according to this embodiment suitably controls the second output current I2 (or the second power P2) by reference to the waveform of the first power P1.

(4) Variations

Note that the embodiment described above is only an exemplary one of various embodiments of the present disclosure and should not be construed as limiting. Rather, the embodiment may be readily modified in various manners depending on a design choice or any other factor without departing from the scope of the present disclosure. Optionally, the function of the power conversion system 10 may also be implemented as, for example, a method for controlling the power conversion system 10, a computer program, or a non-transitory storage medium on which the computer program is stored.

A method for controlling a power conversion system 10 according to an aspect is designed to control a power conversion system 10 including a first circuit 1, a second circuit 2, and a third circuit 3. The power conversion system 10 transmits DC power between a first internal terminal 111, 112 of the first circuit 1 and a second internal terminal 211, 212 of the second circuit 2. In the power conversion system 10, the first internal terminal 111, 112, the second internal terminal 211, 212, and a third internal terminal 341, 342 are electrically connected to the same connection unit 8. The first circuit 1 includes the first internal terminal 111, 112 and a first external terminal 113, 114 and has the first external terminal 113, 114 electrically connected to a power grid 90 (serving as either an AC power supply or an AC load). The second circuit 2 includes the second internal terminal 211, 212 and a second external terminal 213, 214. The third circuit 3 includes at least the third internal terminal 341, 342. The method for controlling this power conversion system 10 includes making the second circuit 2 control a current or power being input to, or output from, the second circuit 2 itself such that the current or the power is synchronized with power ripples caused by a power grid 90 electrically connected to the first circuit 1.

A program according to another aspect is designed to cause a computer system to perform the method for controlling the power conversion system 10 described above. Next, variations of the exemplary embodiment described above will be enumerated one after another.

In the power conversion system 10 according to the present disclosure, the control circuit 6 thereof, for example, includes a computer system. The computer system may include a processor and a memory as principal hardware components. The functions of the power conversion system 10 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). Those electronic circuits may be either integrated together on a single chip or distributed on multiple chips, whichever is appropriate. Those multiple chips may be integrated together in a single device or distributed in multiple devices without limitation.

Also, in the embodiment described above, the plurality of constituent elements of the power conversion system 10 are housed in a single housing. However, this is not an essential configuration for the power conversion system 10. Alternatively, those constituent elements of the power conversion system 10 may be distributed in multiple different housings. Still alternatively, at least some functions of the power conversion system 10 (e.g., the function of the control circuit 6) may be implemented as a server system or a cloud computing system as well.

(4.1) First Variation

Figure 7A:
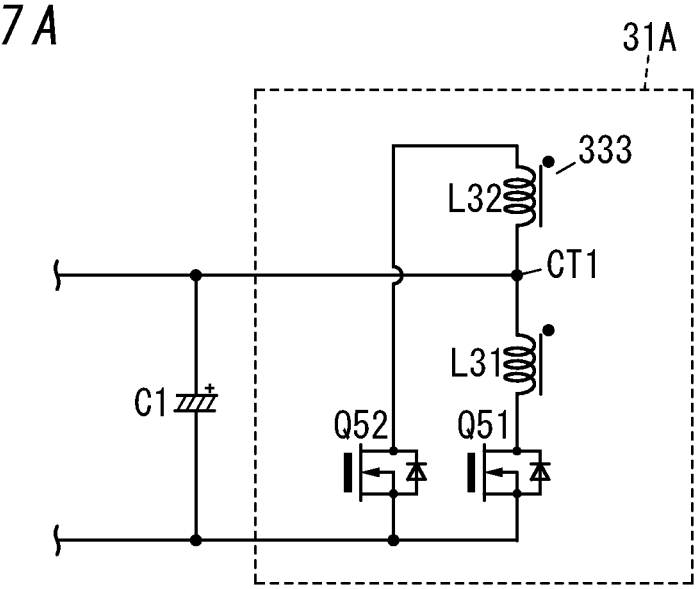
FIGS. 7A and 7B are circuit diagrams illustrating configurations for a primary-side circuit of the third circuit as a constituent element of a power conversion system according to a first variation of the exemplary embodiment of the present disclosure.
Figure 7B:
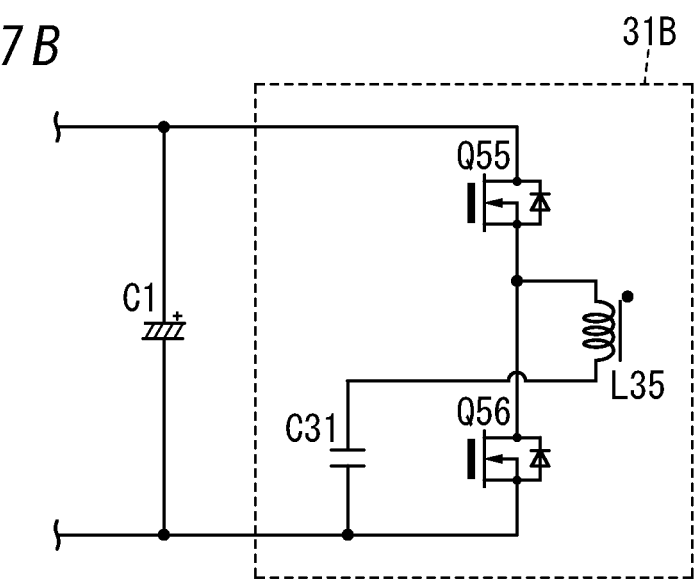
Figure 8:
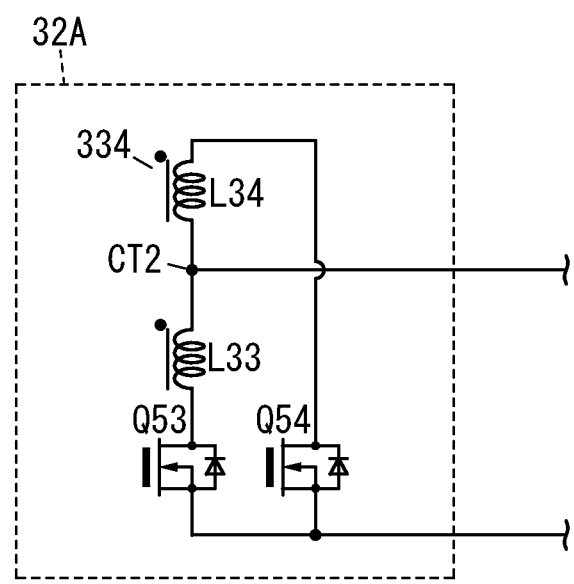
FIG. 8 is a circuit diagram illustrating a configuration for a secondary-side circuit of the third circuit of the power conversion system.

In the embodiment described above, the third circuit 3 is implemented as a converter circuit including the full-bridge primary-side circuit 31 and secondary-side circuit 32. Alternatively, the third circuit 3 may include either a primary-side circuit 31A or a primary-side circuit 31B instead of the primary-side circuit 31 as shown in FIGS. 7A and 7B. In addition, the third circuit 3 may include a secondary-side circuit 32A instead of the secondary-side circuit 32 as shown in FIG. 8. That is to say, the third circuit 3 may include one of the primary-side circuits 31, 31A, 31B and one of the secondary-side circuits 32, 32A. In other words, the third circuit 3 may be a combination of one of the primary-side circuits 31, 31A, 31B and one of the secondary-side circuits 32, 32A. The power conversion system 10 according to a first variation will be described with reference to FIGS. 7A, 7B, and 8. Note that the power conversion system 10 according to the first variation has the same configuration as the power conversion system 10 according to the embodiment except the third circuit 3. Thus, any constituent element of this first variation, having the same function as a counterpart of the embodiment described above, will be designated by the same reference numeral as that counterpart's, and description thereof will be omitted herein.

The power conversion system 10 according to the first variation includes the first circuit 1, the second circuit 2, and the third circuit 3. In addition, the power conversion system 10 further includes the plurality of fourth circuits 4, the filter circuit 5, the control circuit 6, the snubber circuit 7, and the connection unit 8. Moreover, the power conversion system 10 further includes the multiple pairs of first DC terminals T11, T12, the single pair of second DC terminals T21, T22, and the single pair of AC terminals T31, T32.

The primary-side circuit 31A of the third circuit 3 includes two third switching elements Q51, Q52 and a primary winding 333 as shown in FIG. 7A.

Each of the third switching elements Q51, Q52 may be, for example, a depletion mode n-channel MOSFET. Each of the third switching elements Q51, Q52 includes a parasitic diode. The parasitic diode of each of the third switching elements Q51, Q52 has its anode electrically connected to the source of an associated one of the third switching elements Q51, Q52 and has its cathode electrically connected to the drain of the associated one of the third switching elements Q51, Q52.

The primary winding 333 is electrically connected to the capacitor C1 via the third switching elements Q51, Q52. The primary winding 333 may be implemented as, for example, a series circuit of two windings L31, L32, of which the node of connection is a primary-side center tap CT1. That is to say, the two windings L31, L32 are electrically connected in series to form the primary winding 331. The primary-side center tap CT1 is electrically connected to a higher-potential terminal (i.e., located closer to the second DC terminal T21) of the capacitor C1.

The third switching element Q51 is electrically connected in series to the winding L31 across the capacitor C1. The third switching element Q52 is electrically connected in series to the winding L32 across the capacitor C1. In other words, a series circuit of the third switching element Q51 and the winding L31 and a series circuit of the third switching element Q52 and the winding L32 are electrically connected in parallel between the second DC terminals T21, T22.

The third switching element Q51 has its drain electrically connected to the primary-side center tap CT1 via the winding L31. The third switching element Q52 has its drain electrically connected to the primary-side center tap CT1 via the winding L32. The third switching elements Q51, Q52 have their source electrically connected to the second DC terminal T22 having the lower potential (i.e., on the negative electrode side).

Meanwhile, the primary-side circuit 31B of the third circuit 3 includes two third switching elements Q55, Q56, a capacitor C31, and the winding L35 as shown in FIG. 7B.

Each of the third switching elements Q55, Q56 may be, for example, a depletion mode n-channel MOSFET. Each of the third switching elements Q55, Q56 includes a parasitic diode. The parasitic diode of each of the third switching elements Q55, Q56 has its anode electrically connected to the source of an associated one of the third switching elements Q55, Q56 and has its cathode electrically connected to the drain of the associated one of the third switching elements Q55, Q56.

The third switching element Q55 having the higher potential is electrically connected in series to the third switching element Q56 having the lower potential across the capacitor C1. That is to say, a series circuit of the third switching elements Q55, Q56 is electrically connected across the capacitor C1.

The third switching element Q55 having the higher potential has its drain electrically connected to the second DC terminal T21 having the higher potential. The third switching element Q56 having the lower potential has its source electrically connected to the second DC terminal T22 having the lower potential. Also, the third switching element Q55 having the higher potential has its source electrically connected to the drain of the third switching element Q56 having the lower potential.

The winding L35 has its first terminal electrically connected to the node of connection between the third switching elements Q55, Q56. The winding L35 has its second terminal electrically connected to the second DC terminal T22 having the lower potential via the capacitor C31.

The secondary-side circuit 32A of the third circuit 3 includes two third switching elements Q53, Q54 and a secondary winding 334 as shown in FIG. 8.

Each of the third switching elements Q53, Q54 may be, for example, a depletion mode n-channel MOSFET. Each of the third switching elements Q53, Q54 includes a parasitic diode. The parasitic diode of each of the third switching elements Q53, Q54 has its anode electrically connected to the source of an associated one of the third switching elements Q53, Q54 and has its cathode electrically connected to the drain of the associated one of the third switching elements Q53, Q54.

The secondary winding 334 is electrically connected between the terminals 81, 82 via the third switching elements Q53, Q54. The secondary winding 334 may be implemented as, for example, a series circuit of two windings L33, L34, of which the node of connection is a secondary-side center tap CT2. That is to say, the two windings L33, L34 are electrically connected in series to form the secondary winding 334. The secondary-side center tap CT2 is electrically connected to the terminal 81.

The third switching element Q53 is electrically connected in series to the winding L33 between the terminals 81, 82. The third switching element Q54 is electrically connected in series to the winding L34 between the terminals 81, 82. In other words, a series circuit of the third switching element Q53 and the winding L33 and a series circuit of the third switching element Q54 and the winding L34 are electrically connected in parallel between the terminals 81, 82.

The third switching element Q53 has its drain electrically connected to the secondary-side center tap CT2 via the winding L33. The third switching element Q54 has its drain electrically connected to the secondary-side center tap CT2 via the winding L34. The third switching elements Q53, Q54 have their source electrically connected to the terminal 82 having the lower potential (i.e., on the negative electrode side).

Even when any of these primary-side circuits 31A, 31B and secondary-side circuit 32A is used, a DC voltage may still be generated between the terminals 81, 82. Thus, the first circuit 1 and the second circuit 2 may still be electrically connected on the DC side with no smoothing capacitors connected between the terminals 81, 82.

(4.2) Second Variation

The power conversion system 10 may include any one of snubber circuits 7A-7D instead of the snubber circuit 7. The power conversion system 10 according to a second variation will be described with reference to FIGS. 9A-9D. Note that the power conversion system 10 according to the second variation has the same configuration as the power conversion system 10 according to the embodiment described above except the snubber circuit 7A-7D. Thus, any constituent element of this second variation, having the same function as a counterpart of the embodiment described above, will be designated by the same reference numeral as that counterpart's, and description thereof will be omitted herein.

The power conversion system 10 according to the second variation includes the first circuit 1, the second circuit 2, and the third circuit 3. In addition, the power conversion system 10 further includes the plurality of fourth circuits 4, the filter circuit 4, the control circuit 6, any one of the snubber circuits 7A-7D, and the connection unit 8. Moreover, the power conversion system 10 further includes the multiple pairs of first DC terminals T11, T12, the single pair of second DC terminals T21, T22, and the single pair of AC terminals T31, T32.

Figure 9A:
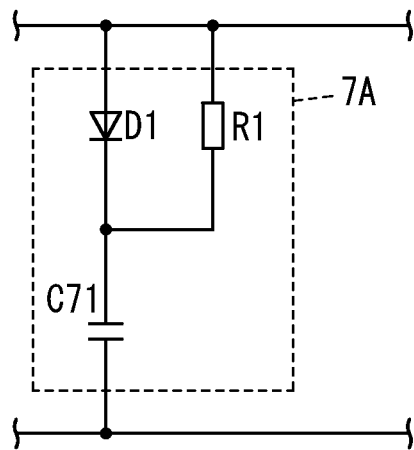
FIGS. 9A-9D are circuit diagrams illustrating configurations for a snubber circuit for use in a power conversion system according to a second variation of the exemplary embodiment of the present disclosure.

The snubber circuit 7A includes a diode D1, a resistor R1, and a capacitor C71 as shown in FIG. 9A. The diode D1 is electrically connected in series to the capacitor C71 between the terminals 81, 82. The diode D1 has its anode electrically connected to the terminal 81 and has its cathode electrically connected to the terminal 82 via the capacitor C71. The resistor R1 is electrically connected between the anode and cathode of the diode D1. In this snubber circuit 7A, the electrical energy stored in the capacitor C71 is consumed by the resistor R1.

Figure 9B:
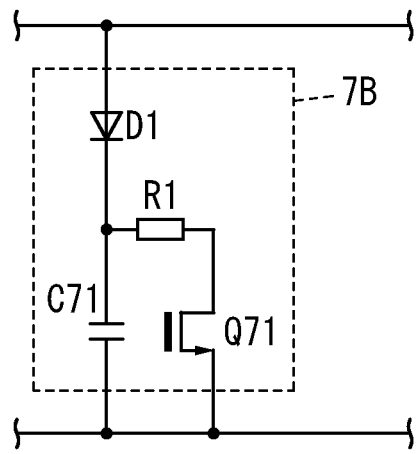

The snubber circuit 7B includes the diode D1, the resistor R1, the capacitor C71, and a switching element Q71 as shown in FIG. 9B. The diode D1 is electrically connected in series to the capacitor C71 between the terminals 81, 82. The diode D1 has its anode electrically connected to the terminal 81 and has its cathode electrically connected to the terminal 82 via the capacitor C71. The resistor R1 has its first terminal electrically connected to the node of connection between the diode D1 and the capacitor C71 and has its second terminal electrically connected to the terminal 82 via the switching element Q71. In this snubber circuit 7B, the electrical energy stored in the capacitor C71 is consumed by the resistor R1 when the switching element Q71 is turned ON.

Figure 9C:
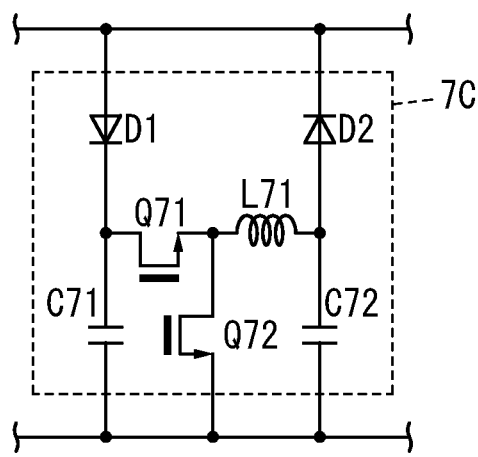

The snubber circuit 7C includes a plurality of (e.g., two in the example illustrated in FIG. 9C) diodes D1, D2, an inductor L71, a plurality of (e.g., two in the example illustrated in FIG. 9C) capacitors C71, C72, and a plurality of (e.g., two in the example illustrated in FIG. 9C) switching elements Q71, Q72 as shown in FIG. 9C. The diode D1 is electrically connected in series to the capacitor C71 between the terminals 81, 82. The diode D2 is electrically connected in series to the capacitor C72 between the terminals 81, 82. The diode D1 has its anode electrically connected to the terminal 81 and has its cathode electrically connected to the terminal 82 via the capacitor C71. The diode D2 has its anode electrically connected to the terminal 82 via the capacitor C72 and has its cathode electrically connected to the terminal 81. That is to say, the diodes D1 and D2 are connected in mutually opposite directions between the terminals 81, 82. The inductor L71 has its first terminal electrically connected to the node of connection between the diode D1 and the capacitor C71 via the switching element Q71 and has its second terminal electrically connected to the node of connection between the diode D2 and the capacitor C72. The switching element Q72 is electrically connected between the terminal 82 and the node of connection between the switching element Q71 and the inductor L71. In this snubber circuit 7C, a step-down chopper circuit is formed by the switching elements Q71, Q72 and the inductor L71. In this snubber circuit 7C, the voltage across the capacitor C71 is stepped down by turning the switching elements Q71, Q72 ON and OFF and electrical energy corresponding to the stepped down voltage across the capacitor C71 is stored in the capacitor C72.

Figure 9D:
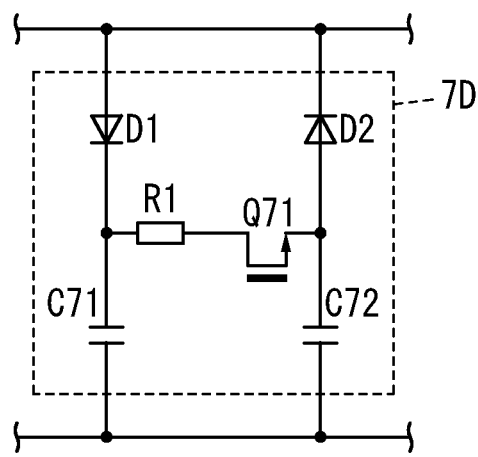

The snubber circuit 7D includes a plurality of (e.g., two in the example illustrated in FIG. 9D) diodes D1, D2, a resistor R1, a plurality of (e.g., two in the example illustrated in FIG. 9D) capacitors C71, C72, and a switching element Q71 as shown in FIG. 9D. The diode D1 is electrically connected in series to the capacitor C71 between the terminals 81, 82. The diode D2 is electrically connected in series to the capacitor C72 between the terminals 81, 82. The diode D1 has its anode electrically connected to the terminal 81 and has its cathode electrically connected to the terminal 82 via the capacitor C71. The diode D2 has its anode electrically connected to the terminal 82 via the capacitor C72 and has its cathode electrically connected to the terminal 81. That is to say, the diodes D1 and D2 are connected in mutually opposite directions between the terminals 81, 82. The resistor R1 has its first terminal electrically connected to the node of connection between the diode D1 and the capacitor C71 and has its second terminal electrically connected to the node of connection between the diode D2 and the capacitor C72 via the switching element Q71. In this snubber circuit 7D, electrical energy stored in the capacitor C71 is stored in the capacitor C72 via the resistor R1 when the switching element Q71 is turned ON.

Even in the snubber circuits 7A-7D, when the bus voltage Vbus between the terminals 81, 82 exceeds a first clamp value, part of the electrical energy in excess of the first clamp value is absorbed from the terminals 81, 82, thereby clamping an upper limit value of the bus voltage at the first clamp value. Also, in the snubber circuits 7C, 7D, when the bus voltage becomes lower than a second clamp value (<the first clamp value), the electrical energy is injected (regenerated) into the terminals 81, 82, thereby clamping the lower limit value of the bus voltage at the second clamp value.

Therefore, providing the power conversion system 10 with any one of the snubber circuits 7A-7D instead of the snubber circuit 7 may reduce the chances of ringing or a surge voltage being generated in the power conversion system 10.

(4.3) Other Variations

Other variations of the embodiment described above will be enumerated one after another.

The embodiment has been described mainly about the operation in the inverter mode. However, almost the same statement is applicable to the operation in the converter mode as well.

Also, in the embodiment described above, the power conversion system 10 has the two operation modes, namely, the inverter mode and the converter mode. However, this is not an essential feature for the power conversion system 10. Alternatively, the power conversion system 10 may have only the inverter mode as its operation mode or only the converter mode as its operation mode. In other words, the power conversion system 10 does not have to be configured to convert power bidirectionally but may also be configured to convert power only unidirectionally.

Optionally, to each of the first switching elements Q11-Q14, the second switching elements Q21, Q22, the third switching elements Q31-Q38, and the fourth switching elements Q41, Q42, an external diode may be connected instead of the parasitic diode. Furthermore, each of the first switching elements Q11-Q14, the second switching elements Q21, Q22, the third switching elements Q31-Q38, and the fourth switching elements Q41, Q42 does not have to be a MOSFET but may also be an npn-type insulated gate bipolar transistor, for example. In that case, the diode is electrically connected between the emitter and collector of the bipolar transistor in such a direction in which a current is allowed to flow in the opposite direction from the current flowing through the switching element while the switching element is ON.

Furthermore, the control circuit 6 does not have to be a microcomputer but may also be implemented as, for example, a central processing unit (CPU), a field-programmable gate array (FPGA), an application specific integrated circuit (ASIC), or any other appropriate type of circuit.

Optionally, the snubber circuit 7, 7A, 7B, 7C, 7D may be omitted. Furthermore, in the embodiment described above, the snubber circuit 7 is connected between the terminals 81, 82 and the first circuit 1. Alternatively, the snubber circuit 7, 7A, 7B, 7C, 7D may also be connected, for example, between the second circuit 2 and the terminal 81, 82 or between the third circuit 3 and the terminal 81, 82.

Optionally, the connection unit 8 may include a smoothing capacitor.

Also, in the embodiment described above, the power grid 90 electrically connected to the first circuit 1 is a single-phase AC grid. Alternatively, the power grid 90 may also be a three-phase AC grid having U-, V- and W-phases. In that case, when these three phases are balanced, no ripples are caused. On the other hand, when these three phases are imbalanced, ripples are caused. Nevertheless, since the ripples caused when the three phases are imbalanced are smaller than the ripples caused in the case of the single phase, the effect of the ripples may be reduced more effectively.

Furthermore, in the embodiment described above, the second circuit 2 and the fourth circuit 4 are each a synchronous rectifying step-up chopper circuit. Alternatively, the second circuit 2 and the fourth circuit 4 may also be an asynchronous rectifying step-up chopper circuit. Still alternatively, the second circuit 2 and the fourth circuit 4 may also be an insulated step-up chopper circuit. Yet alternatively, the second circuit 2 may also be a step-down chopper circuit for lowering the DC voltage that has been boosted by the fourth circuit 4 or a step-up/down chopper circuit for raising and lowering the DC voltage supplied from the fourth circuit 4.

Furthermore, in the embodiment described above, the four fourth circuits 4 are connected to the second circuit 2. Alternatively, one, two, three, or even five or more fourth circuits 4 may be connected to the second circuit 2. Still alternatively, the fourth circuits 4 may also be omitted. That is to say, the solar battery 70 may be connected directly to the second circuit 2.

Furthermore, in the embodiment described above, the third circuit 3 is a DC/DC converter. Alternatively, the third circuit 3 may also be the storage battery 80. This eliminates the need to control the third circuit 3. In addition, since no comparator circuits are required, the power conversion system 10 may be downsized as well. Still alternatively, the third circuit 3 may also be a non-insulated DC/DC converter such as a chopper circuit.

Furthermore, in the embodiment described above, the voltage source to supply DC voltage to the fourth circuits 4 is the solar battery 70. However, the voltage source does not have to be the solar battery 70 but may also be a storage battery or a fuel cell, for example. Alternatively, the voltage source may also be implemented as, for example, a comparator circuit which may serve as a DC voltage source.

Furthermore, in the embodiment described above, the voltage source to supply DC voltage to the third circuit 3 is the storage battery 80. However, the voltage source does not have to be the storage battery 80 but may also be a solar battery or a fuel cell, for example. Alternatively, the voltage source may also be implemented as, for example, a comparator circuit which may serve as a DC voltage source.

Furthermore, in the embodiment described above, the power grid 90 is connected to the first circuit 1. Alternatively, an electric circuit, a load device, an electric motor, or any other suitable device may be connected to the first circuit 1 as long as the device receives AC voltage as an input voltage.

(Recapitulation)

As can be seen from the foregoing description, a power conversion system (10) according to a first aspect includes a first circuit (1) and a second circuit (2) and transmits DC power between a first internal terminal (111, 112) of the first circuit (1) and a second internal terminal (211, 212) of the second circuit (2). The first circuit (1) includes the first internal terminal (111, 112) and a first external terminal (113, 114) and has the first external terminal (113, 114) electrically connected to either an AC power supply or an AC load. The second circuit (2) includes the second internal terminal (211, 212) and a second external terminal (213, 214). The power conversion system (10) further includes a third circuit (3). The third circuit (3) includes at least a third internal terminal (341, 342). In the power conversion system (10), the first internal terminal (111, 112), the second internal terminal (211, 212), and the third internal terminal (341, 342) are electrically connected to the same connection unit (8). The second circuit (2) controls a current or power being input to, or output from, the second circuit (2) itself such that the current or the power is synchronized with power ripples caused by the AC power supply or the AC load. Either the AC power supply or the AC load is electrically connected to the first circuit (1).

According to this aspect, the second circuit (2) controls a current or power being input to, or output from, the second circuit (2) itself such that the current or the power is synchronized with power ripples caused by an AC power supply or an AC load. This allows the second circuit (2) to take charge of at least a part of the power ripples caused by the AC power supply or the AC load. Consequently, this may reduce the effect of the power ripples on the third circuit (3) even without using any smoothing capacitor.

In a power conversion system (10) according to a second aspect, which may be implemented in conjunction with the first aspect, the third circuit (3) includes a switching element (Q31-Q38) and a transformer (33) electrically connected to the switching element (Q31-Q38). The third circuit (3) is configured to provide an output voltage (VT) across a secondary winding (332) of the transformer (33) via the switching element (Q31-Q38) and the transformer (33). The secondary winding (332) is electrically connected to the third internal terminal (341, 342). The output voltage (VT) has a waveform (W1) including a rising range (W11), a falling range (W13), and a flat range (W12). In the rising range (W11), the output voltage (VT) changes from a first potential (VT1) to a second potential (VT2) higher than the first potential (VT1). In the falling range (W13), the output voltage (VT) changes from the second potential (VT2) to the first potential (VT1). In the flat range (W12), the output voltage (VT) is maintained at either the first potential (VT1) or the second potential (VT2).

This aspect allows the first circuit (1) and the second circuit (2) to be connected on the DC side with no smoothing capacitors used.

In a power conversion system (10) according to a third aspect, which may be implemented in conjunction with the first or second aspect, the third circuit (3) includes a converter circuit (e.g., a primary-side circuit 31 and a secondary-side circuit 32) to perform DC-DC conversion on a DC voltage supplied from a storage battery (80). The second circuit (2) controls, when the storage battery (80) has a battery level equal to or greater than 20% and equal to or less than 80%, the current or the power such that a sharing ratio of the power ripples to the third circuit (3) is greater than a sharing ratio of the power ripples to the second circuit (2).

This aspect may reduce the effect of the power ripples on the second circuit (2).

In a power conversion system (10) according to a fourth aspect, which may be implemented in conjunction with the first or second aspect, the third circuit (3) includes a converter circuit (e.g., a primary-side circuit 31 and a secondary-side circuit 32) to perform DC-DC conversion on a DC voltage supplied from a storage battery (80). The second circuit (2) controls, when the storage battery (80) has a battery level less than 20% or greater than 80%, the current or the power such that a sharing ratio of the power ripples to the third circuit (3) is smaller than a sharing ratio of the power ripples to the second circuit (2).

This aspect may reduce the effect of the power ripples on the third circuit (3).

In a power conversion system (10) according to a fifth aspect, which may be implemented in conjunction with the first or second aspect, the third circuit (3) includes a converter circuit (e.g., a primary-side circuit 31 and a secondary-side circuit 32) to perform DC-DC conversion on a DC voltage supplied from a storage battery (80). The second circuit (2) controls the current or the power such that a first sharing ratio is smaller than a second sharing ratio. The first sharing ratio is a sharing ratio of the power ripples to the third circuit (3) when the storage battery (80) has a battery level less than 20% or greater than 80%. The second sharing ratio is a sharing ratio of the power ripples to the third circuit (3) when the storage battery (80) has a battery level equal to or greater than 20% and equal to or less than 80%.

This aspect may curb a decline in allowable power of the storage battery (80) by reducing the first sharing ratio.

A power conversion system (10) according to a sixth aspect, which may be implemented in conjunction with any one of the first to fifth aspects, further includes a fourth circuit (4) electrically connected in series to the second circuit (2). The second circuit (2) controls the current or the power such that a sharing ratio of the power ripples to the second circuit (2) is greater than a sum of a sharing ratio of the power ripples to the third circuit (3) and a sharing ratio of the power ripples to the fourth circuit (4).

This aspect may reduce the power ripples in the third circuit (3) and the fourth circuit (4).

In a power conversion system (10) according to a seventh aspect, which may be implemented in conjunction with the first or second aspect, the third circuit (3) is a storage battery (80).

According to this aspect, there is no need to control the third circuit (3). In addition, since no converter circuit is required, the overall size of the power conversion system (10) may be reduced.

Figure 10:
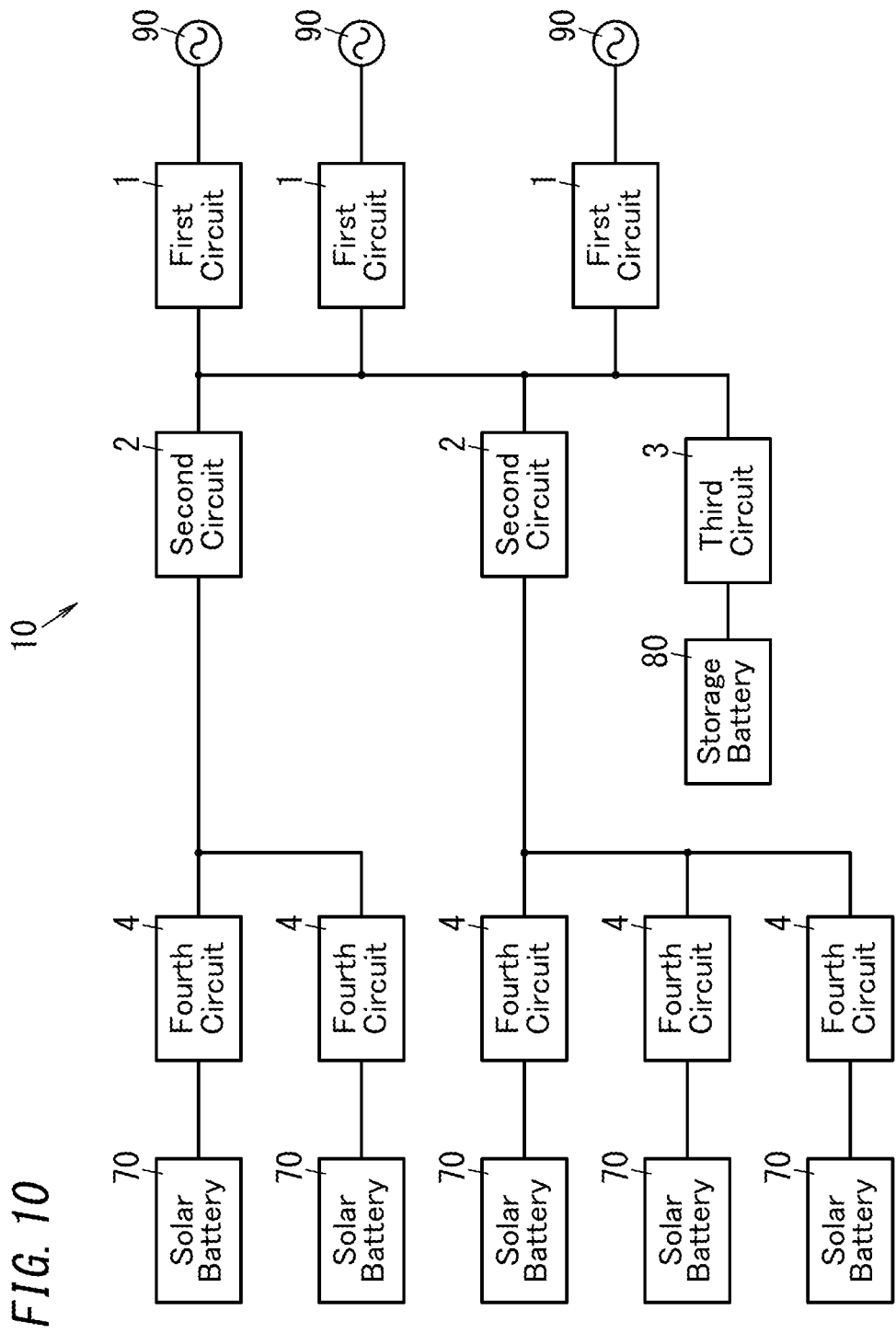
FIG. 10 illustrates an exemplary power conversion system according to another embodiment.

FIG. 10 illustrates a power conversion system (10) according to an eighth aspect, which may be implemented in conjunction with any one of the first to seventh aspects, includes a plurality of first circuits (1), one of which is the first circuit (1), and a plurality of second circuits (2), one of which is the second circuit (2). A particular second circuit (2) controls a current or power being input to, or output from, the particular second circuit (2) itself such that the current or the power is synchronized with a total of the power ripples caused by a plurality of AC power supplies or a plurality of AC loads. The plurality of AC power supplies or the plurality of AC loads are electrically connected to the plurality of first circuits (1). The AC power supply is one of the plurality of AC power supplies. The AC load is one of the plurality of AC loads. The particular second circuit (2) is at least one second circuit (2) out of the plurality of second circuits (2).

This aspect allows the particular second circuit (2) to take charge of at least a part of the power ripples caused by the AC power supply or the AC load. Consequently, this may reduce the effect of the power ripples on the third circuit (3) even without using any smoothing capacitor.

A method for controlling a power conversion system (10) according to a ninth aspect is designed to control a power conversion system (10) including a first circuit (1), a second circuit (2), and a third circuit (3). The power conversion system (10) transmits DC power between a first internal terminal (111, 112) of the first circuit (1) and a second internal terminal (211, 212) of the second circuit (2). In the power conversion system (10), the first internal terminal (111, 112), the second internal terminal (211, 212), and a third internal terminal (341, 342) are electrically connected to the same connection unit (8). The first circuit (1) includes the first internal terminal (111, 112) and a first external terminal (113, 114) and has the first external terminal (113, 114) electrically connected to either an AC power supply or an AC load. The second circuit (2) includes the second internal terminal (211, 212) and a second external terminal (213, 214). The third circuit (3) includes at least the third internal terminal (341, 342). The method for controlling this power conversion system (10) includes making the second circuit (2) control a current or power being input to, or output from, the second circuit (2) itself such that the current or the power is synchronized with power ripples caused by the AC power supply or the AC load. Either the AC power supply or the AC load is electrically connected to the first circuit (1).

According to this aspect, the second circuit (2) controls a current or power being input to, or output from, the second circuit (2) itself such that the current or the power is synchronized with power ripples caused by an AC power supply or an AC load. This allows the second circuit (2) to take charge of at least a part of the power ripples caused by the AC power supply or the AC load. Consequently, this may reduce the effect of the ripples on the third circuit (3) even without using any smoothing capacitor.

A program according to a tenth aspect is designed to cause a computer system to perform the method for controlling the power conversion system (10) according to the ninth aspect.

According to this aspect, the second circuit (2) controls a current or power being input to, or output from, the second circuit (2) itself such that the current or the power is synchronized with power ripples caused by an AC power supply or an AC load. This allows the second circuit (2) to take charge of at least a part of the power ripples caused by the AC power supply or the AC load. Consequently, this may reduce the effect of the ripples on the third circuit (3) even without using any smoothing capacitor.

Note that the constituent elements according to the second to eighth aspects are not essential constituent elements for the power conversion system (10) but may be omitted as appropriate.

REFERENCE SIGNS LIST

1 First Circuit
111, 112 First Internal Terminal
113, 114 First External Terminal
Q11-Q14 First Switching Element
2 Second Circuit
211, 212 Second Internal Terminal
213, 214 Second External Terminal
Q21, Q22 Second Switching Element
3 Third Circuit
33 Transformer
341, 342 Third Internal Terminal
343, 344 Third External Terminal
Q31-Q38 Third Switching Element (Switching Element)
6 Control Circuit
8 Connection Unit
10 Power Conversion System
I2 Second Output Current (Current)
VT Output Voltage
VT1 First Potential
VT2 Second Potential
W1 Waveform of Output Voltage
W11 Rising Range
W12 Flat Range
W13 Falling Range

The invention claimed is:

1. A power conversion system comprising:
a first circuit including a first internal terminal and a first external terminal and having the first external terminal electrically connected to either an AC power supply or an AC load; and
a second circuit including a second internal terminal and a second external terminal,
the power conversion system being configured to transmit DC power between the first internal terminal of the first circuit and the second internal terminal of the second circuit,
the power conversion system further comprising a third circuit including at least a third internal terminal,
the first internal terminal, the second internal terminal, and the third internal terminal being electrically connected to the same connection unit,
the second circuit being configured to control a current or power being input to, or output from, the second circuit itself such that the current or the power is synchronized with power ripples caused by the AC power supply or the AC load, either the AC power supply or the AC load being electrically connected to the first circuit,
the third circuit including a converter circuit configured to perform DC-DC conversion on a DC voltage supplied from a storage battery, and
the second circuit being configured to, when the storage battery has a battery level equal to or greater than 20% and equal to or less than 80%, control the current or the power such that a sharing ratio of the power ripples to the third circuit is greater than a sharing ratio of the power ripples to the second circuit.

2. The power conversion system of claim 1, wherein
the third circuit includes a switching element and a transformer electrically connected to the switching element, the third circuit being configured to provide a transformer voltage across a secondary winding of the transformer via the switching element and the transformer,
the secondary winding is electrically connected to the third internal terminal, and
the transformer voltage has a waveform including:
a rising range in which the transformer voltage changes from a first potential to a second potential higher than the first potential;
a falling range in which the transformer voltage changes from the second potential to the first potential; and
a flat range in which the transformer voltage is maintained at either the first potential or the second potential.

3. The power conversion system of claim 2, wherein
the third circuit includes a storage battery.

4. The power conversion system of claim 1, wherein
the third circuit includes a storage battery.

5. The power conversion system of claim 1, comprising a plurality of first circuits, one of which is the first circuit, and a plurality of second circuits, one of which is the second circuit, wherein
a particular second circuit, which is at least one second circuit out of the plurality of second circuits, is configured to control a current or power being input to, or output from, the particular second circuit itself such that the current or the power is synchronized with a total of the power ripples caused by a plurality of AC power supplies or a plurality of AC loads, either the plurality of AC power supplies or the plurality of AC loads being electrically connected to the plurality of first circuits, the AC power supply being one of the plurality of AC power supplies, the AC load being one of the plurality of AC loads.

6. A method for controlling a power conversion system, the power conversion system including:
a first circuit including a first internal terminal and a first external terminal and having the first external terminal electrically connected to either an AC power supply or an AC load;
a second circuit including a second internal terminal and a second external terminal; and
a third circuit including a third internal terminal, and a converter circuit configured to perform DC-DC conversion on a DC voltage supplied from a storage battery,
the power conversion system being configured to transmit DC power between the first internal terminal of the first circuit and the second internal terminal of the second circuit,
the first internal terminal, the second internal terminal, and the third internal terminal being electrically connected to the same connection unit,
the method comprising making:
the second circuit control a current or power being input to, or output from, the second circuit itself such that the current or the power is synchronized with power ripples caused by the AC power supply or the AC load, either the AC power supply or the AC load being electrically connected to the first circuit, and
the second circuit, when the storage battery has a battery level equal to or greater than 20% and equal to or less than 80%, control the current or the power such that a sharing ratio of the power ripples to the third circuit is greater than a sharing ratio of the power ripples to the second circuit.

7. A non-transitory computer-readable tangible recording medium storing a program designed to cause a computer system to perform the method for controlling the power conversion system according to claim 6.

8. A power conversion system comprising:
a first circuit including a first internal terminal and a first external terminal and having the first external terminal electrically connected to either an AC power supply or an AC load; and
a second circuit including a second internal terminal and a second external terminal,
the power conversion system being configured to transmit DC power between the first internal terminal of the first circuit and the second internal terminal of the second circuit,
the power conversion system further comprising a third circuit including at least a third internal terminal and a fourth circuit electrically connected in series to the second circuit,
the first internal terminal, the second internal terminal, and the third internal terminal being electrically connected to the same connection unit,
the second circuit being configured to control a current or power being input to, or output from, the second circuit itself such that the current or the power is synchronized with power ripples caused by the AC power supply or the AC load, either the AC power supply or the AC load being electrically connected to the first circuit,
the second circuit being configured to control the current or the power such that a sharing ratio of the power ripples to the second circuit is greater than a sum of a sharing ratio of the power ripples to the third circuit and a sharing ratio of the power ripples to the fourth circuit.

9. A method for controlling a power conversion system, the power conversion system including:
a first circuit including a first internal terminal and a first external terminal and having the first external terminal electrically connected to either an AC power supply or an AC load;
a second circuit including a second internal terminal and a second external terminal; and
a third circuit including a third internal terminal, and a converter circuit configured to perform DC-DC conversion on a DC voltage supplied from a storage battery,
the power conversion system being configured to transmit DC power between the first internal terminal of the first circuit and the second internal terminal of the second circuit,
the first internal terminal, the second internal terminal, and the third internal terminal being electrically connected to the same connection unit,
the method comprising making:
the second circuit control a current or power being input to, or output from, the second circuit itself such that the current or the power is synchronized with power ripples caused by the AC power supply or the AC load, either the AC power supply or the AC load being electrically connected to the first circuit, and
the second circuit control the current or the power such that a sharing ratio of the power ripples to the third circuit when the storage battery has a battery level less than 20% or greater than 80% is smaller than a sharing ratio of the power ripples to the third circuit when the storage battery has a battery level equal to or greater than 20% and equal to or less than 80%.

10. A method for controlling a power conversion system, the power conversion system including:
a first circuit including a first internal terminal and a first external terminal and having the first external terminal electrically connected to either an AC power supply or an AC load;
a second circuit including a second internal terminal and a second external terminal;
a third circuit including a third internal terminal; and
a fourth circuit electrically connected in series to the second circuit,
the power conversion system being configured to transmit DC power between the first internal terminal of the first circuit and the second internal terminal of the second circuit,
the first internal terminal, the second internal terminal, and the third internal terminal being electrically connected to the same connection unit,
the method comprising making:
the second circuit control a current or power being input to, or output from, the second circuit itself such that the current or the power is synchronized with power ripples caused by the AC power supply or the AC load, either the AC power supply or the AC load being electrically connected to the first circuit, and
the second circuit control the current or the power such that a sharing ratio of the power ripples to the second circuit is greater than a sum of a sharing ratio of the power ripples to the third circuit and a sharing ratio of the power ripples to the fourth circuit.

* * * * *